US006993431B2

(12) United States Patent
Hollingshead et al.

(10) Patent No.: US 6,993,431 B2
(45) Date of Patent: Jan. 31, 2006

(54) ASSEMBLY MOVES USING FLOAT-REMAINING FIGURES

(75) Inventors: Paul C. Hollingshead, Florissant, MO (US); Bruce A. Wilson, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/860,521

(22) Filed: Jun. 1, 2004

(65) Prior Publication Data

US 2005/0288890 A1 Dec. 29, 2005

(51) Int. Cl.
 *G06K 9/36* (2006.01)

(52) U.S. Cl. .................................... 702/1.55
(58) Field of Classification Search ............... 702/1.55; 716/2; 707/224; 33/27, 810, 818, 618, 430, 33/510; 239/205; 73/649; 455/63; 382/1.52; 428/198

See application file for complete search history.

(56) References Cited

U.S. PATENT DOCUMENTS 4,288,852 A * 9/1981 Holland ..................... 382/152

OTHER PUBLICATIONS

U.S. Appl. No. 10/792,089, filed Mar. 2, 2004.
U.S. Appl. No. 10/800,383, filed Mar. 12, 2004.

* cited by examiner

*Primary Examiner*—Michael Nghiem
*Assistant Examiner*—Tung S. Lau
(74) *Attorney, Agent, or Firm*—Shimokaji & Associates, P.C.

(57) ABSTRACT

One aspect is a method which determines a float remaining figure (for example, a float remaining circle) for a manufactured pattern of features. In some embodiments, the size and relative location of two or more float remaining figures, each for a different part (each part typically designed in accordance with a different pattern of features), are compared and optionally also transformed to provide a quantifiable measure of whether the two parts fit (or can be modified to fit) and if so how well the parts fit. Other aspects are systems programmed to perform any embodiment of the method, and computer readable media which store code for implementing any embodiment of the method.

7 Claims, 17 Drawing Sheets

ASSEMBLY MOVES USING FLOAT-REMAINING FIGURES

CROSS-REFERENCE TO RELATED APPLICATIONS

This application is related to U.S. application Ser. No. 10/792,089, filed on Mar. 2, 2004, and U.S. application Ser. No. 10/800,383, filed on Mar. 12, 2004. The full text of each of U.S. applications Ser. No. 10/792,089 and Ser. No. 10/800,383 is incorporated herein by reference.

BACKGROUND OF THE INVENTION

The present invention generally relates to the production of articles of manufacture in a computer simulation or in the real world, and more particularly, to a method and system for accurately evaluating part-to-part fit up between two or more simulated or manufactured articles.

Throughout the disclosure, and in the claims, the term "manufactured" (as in a "manufactured" article, pattern, or feature) without a modifier is used in broad sense to denote either actually manufactured (manufactured in the real world) or simulated (determined by simulation data).

American, Canadian, German, and International Organization for Standardization (ISO) standards define methods for specifying multiple levels of pattern and feature related tolerances often referred to as composite positional tolerances. Composite positional tolerances include a pattern locating tolerance and a feature relating tolerance. A pattern locating tolerance is a tolerance that relates a collection of manufactured features on an object relative individually to the specified datums of the designed pattern. A feature relating tolerance can be a tolerance that is linked to the size of a feature, that controls the positions of a set of features relative to each other, and/or controls the rotation of a pattern of features relative to a specified origin.

A tolerance specification may be applicable at maximum material condition (MMC) or least material condition (LMC). MMC may be defined as the condition in which a feature of size contains the maximum amount of material within the stated limits of size, for example, minimum hole diameter or maximum shaft diameter. LMC may be defined as the condition in which a feature of size contains the least amount of material within the stated limits of size, for example, maximum hole diameter, or minimum shaft diameter. An allowable tolerance may be specified as the combination of the feature-relating tolerances and the departure from a material condition.

With reference to FIG. 1, one method for documenting inspection data consists of paper gauging in which information is recorded on paper. Measurements are taken and errors are plotted on a grid 94 at an enlarged scale using a true position 96 as the origin. Hole positions 92 are then plotted on the grid 94. Concentric circles 90 representing tolerance zone diameters are then overlaid to determine positional errors. This method is time consuming because it is not automated, and it is not used with an automated process. Another problem with the method is the difficulty of best fitting the concentric circles 90 into a position that encompasses all the hole positions 92 within the applicable concentric circle.

Another method for documenting inspection and simulation data uses variation analysis software that assesses feature tolerances. Approximations and iterations are used that combine size, orientation, and location variations. Multiple iterations of inspecting feature size and positions are used to increase accuracy. However, using approximations reduces accuracy, and using multiple iterations causes excessive analysis time.

Variation effects from a pattern of features may be determined when performing a variation analysis of a design prior to manufacturing that design. The variation analysis software performs hundreds or thousands of simulated build cycles, and in each cycle, varies all of the parameters randomly. Assembly variation analysis that utilizes feature patterns, such as holes, for assembly is currently reliant on approximations and iterations for the assembly of parts. Such a process may introduce error, is inefficient, and requires advanced software skills for completion.

Simulating assembly moves in which position is determined by a pattern of holes or other features is a complicated task. It is usually difficult to set up with confidence and show credibility of the results. A specialist is usually required to define the move, and he or she cannot respond as quickly as desired when asked for an evaluation.

There is a need to accurately determine variation effects on patterns of features during variation analysis, and to provide a quantifiable measure of how well two parts fit (each part having a pattern of features).

SUMMARY OF THE INVENTION

Some embodiments of the present invention generate data (regarding a manufactured pattern of features) determining a single figure (typically a circle) referred to herein as a "float remaining" figure. In cases in which the float remaining figure is a circle, it is referred to as a "float remaining" circle. Typical ones of such embodiments use the data to assess available clearance for the pattern, and use the float remaining figure for the pattern rather than manipulating and performing calculations on data indicative of multiple features (e.g., holes or pins) of the pattern. In some embodiments, the size and relative location of two or more float remaining figures, each for a different part (each part typically designed in accordance with a different pattern of features), are compared and transformed (preferably in accordance with simple math and geometry operations) to provide a quantifiable measure of how well the two parts fit.

One aspect of the invention is a method for assessing at least one float remaining figure for at least one pattern of features, for example to help calculate how well manufactured parts (designed to have a pattern of features) can be assembled with other parts (e.g., other parts designed to have features complementary to the first pattern of features). In a class of embodiments, the method includes the step of determining a float remaining figure having a size (e.g., diameter) which is indicative of float remaining in a manufactured pattern (e.g., a simulated manufactured pattern or an actually manufactured pattern) of features and a center position indicative of combined location errors of the individual features in the pattern. The float remaining in the manufactured pattern is the remaining clearance of the pattern, assuming that some of the pattern's predetermined allowable clearance has been consumed by the manufacturing process. In some such embodiments, the float remaining figure is a circle, sometimes referred to herein as a "float remaining" or "$F_R$ circle." The diameter of an $F_R$ circle for a manufactured pattern is indicative of remaining clearance of the pattern. To use an $F_R$ circle in accordance with typical embodiments of the invention, its center position is determined by a construct indicative of consumed tolerance of the pattern (e.g., the center of the $F_R$ circle is the center of a feature-relating tolerance consumed circle of the type described in above-referenced U.S. application Ser. No. 10/800,383 (e.g., circle 122 of FIG. 12 of U.S. application Ser. No. 10/800,383), or the center of a maximum inscribed circle of the type described in above-referenced U.S. application Ser. No. 10/792,089).

Another aspect of the invention is a method for assessing available clearance of a pattern of features, including the step of determining a float remaining figure having size and location indicative of float remaining in the pattern.

Another aspect of the invention is a method for assessing fit of a pattern of features with a second pattern of features, including the steps of:

determining a float remaining figure having size and location indicative of float remaining in the pattern;

determining a second float remaining figure having size and location indicative of float remaining in the second pattern; and determining at least one of relative location of the float remaining figure and the second float remaining figure, and overlap of the float remaining figure and the second float remaining figure.

Another aspect of the invention is a method for assessing fit of a pattern of features with a second pattern of features, including the steps of:

processing data indicative of the pattern to generate data indicative of a feature-relating tolerance consumed circle having a center;

generating a float remaining circle having a diameter and a center position by processing data indicative of the pattern, wherein the diameter is indicative of float remaining in the pattern, and the center position of the float remaining circle is determined by the center of the feature-relating tolerance consumed circle;

generating a second float remaining circle, having a diameter indicative of float remaining in the second pattern, by processing data indicative of the second pattern;

determining a common framework for the features of the pattern and the features of the second pattern, such that the common framework determines relative location of the float remaining circle and the second float remaining circle;

generating an adjusted float remaining circle by processing data indicative of an adjusted version of the pattern; and using the float remaining circle and the second float remaining circle to assess fit of the pattern with the second pattern, and using the adjusted float remaining circle and the second float remaining circle to assess fit of the adjusted version of the pattern with the second pattern.

Another aspect of the invention is a method for assessing fit of a pattern of features with a second pattern of features, including the steps of:

processing data indicative of the pattern to generate data indicative of a maximum inscribed circle for the pattern;

generating a float remaining circle having a diameter and a center position by processing data indicative of the pattern, wherein the diameter is indicative of float remaining in the pattern, and the center position of the float remaining circle is determined by the center of the maximum inscribed circle;

generating a second float remaining circle, having a diameter indicative of float remaining in the second pattern, by processing data indicative of the second pattern;

determining a common framework for the features of the pattern and the features of the second pattern, such that the common framework determines relative location of the float remaining circle and the second float remaining circle;

generating an adjusted float remaining circle by processing data indicative of an adjusted version of the pattern; and using the float remaining circle and the second float remaining circle to assess fit of the pattern with the second pattern, and using the adjusted float remaining circle and the second float remaining circle to assess fit of the adjusted version of the pattern with the second pattern.

Another aspect of the invention is a computer readable medium which stores code for programming a processor to assess available clearance of a pattern of features, including by determining a float remaining figure having size and location indicative of float remaining in the pattern.

Another aspect of the invention is a computer readable medium which stores code for programming a processor to assess fit of a pattern of features with a second pattern of features, including by:

determining a float remaining figure having size and location indicative of float remaining in the pattern (and optionally having a center position indicative of combined location errors for the pattern);

determining a second float remaining figure having size and location indicative of float remaining in the second pattern (and optionally having a center position indicative of combined location errors for the second pattern); and determining at least one of relative location of the float remaining figure and the second float remaining figure, and overlap of the float remaining figure and the second float remaining figure.

Another aspect of the invention is a computer system, comprising a processor programmed to assess available clearance of a pattern of features, including by determining a float remaining figure having size and location indicative of float remaining in the pattern.

Another aspect of the invention is a computer system, including:

a processor programmed to assess fit of a pattern of features with a second pattern of features, including by:

determining a float remaining figure having size indicative of float remaining in the pattern and a center position indicative of combined location errors;

determining a second float remaining figure having size indicative of float remaining in the second pattern and a center position indicative of combined location errors; and determining at least one of relative location of the float remaining figure and the second float remaining figure, and overlap of the float remaining figure and the second float remaining figure.

Other aspects of the invention are a computer system programmed to perform any embodiment of the inventive method, and a computer readable medium which stores code for programming a processor to implement any embodiment of the inventive method.

These and other features, aspects and advantages of the invention will become better understood with reference to the following drawings, description and claims.

In a variety of industries, there is a need for accurate evaluation of inspection and simulation data, for evaluation of inspection and simulation data in a timely manner, for quick analysis of inspection and simulation data in a step of the manufacturing process so that the results of the analysis can be used in subsequent processes, for accurate determination of variation effects on patterns of features during variation analysis, and for provision of a quantifiable measure of how well two parts fit (each part having a pattern of features).

DETAILED DESCRIPTION OF THE INVENTION

Figure 1:
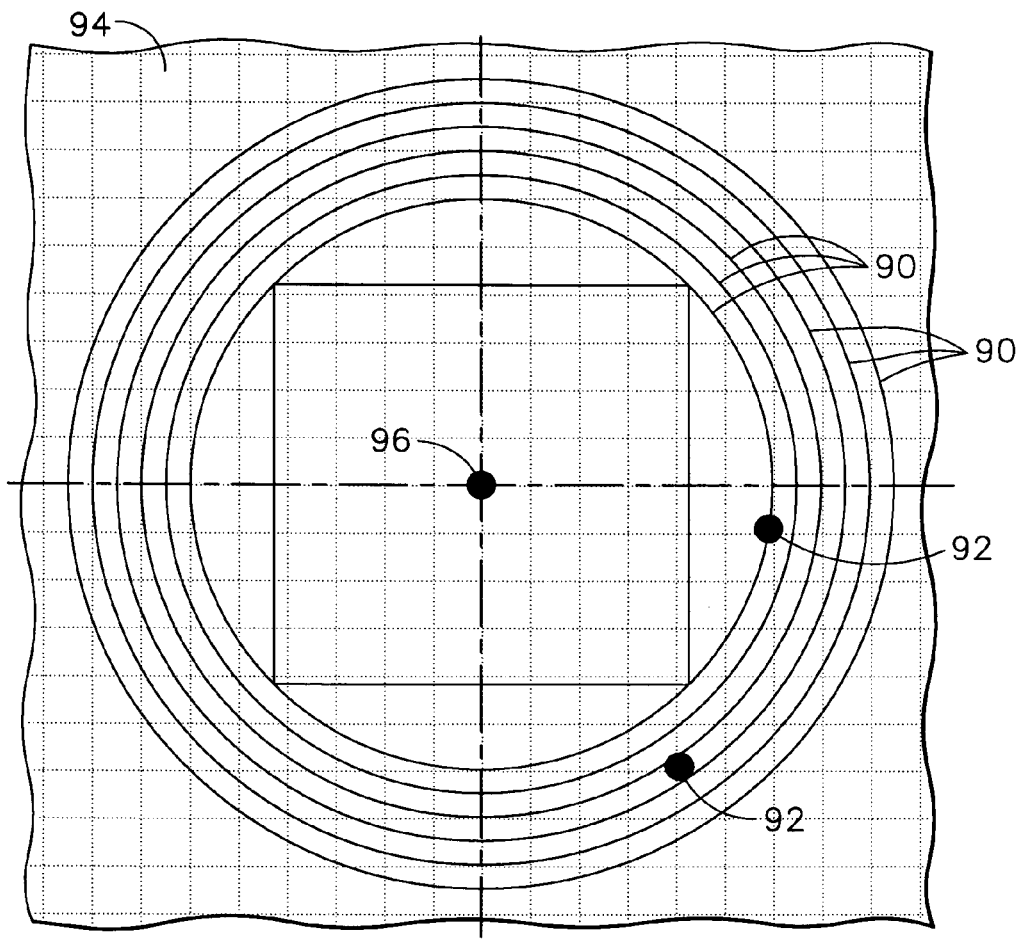
FIG. 1 is a diagram illustrating a prior art paper gauging technique for documenting inspection data.

The following description is of the best currently contemplated modes of carrying out the invention. The description is not to be taken in a limiting sense, but is made merely for the purpose of illustrating the general principles of the invention since the scope of the invention is defined by the appended claims. Although embodiments of the invention are described with reference to features of manufactured patterns, such references apply equally well to features generated in computer simulations and to features produced in fabrication processes.

Important benefits of typical embodiments of the invention include simplification of pattern moves in computer modeling, in assembly simulation and variation analysis, making set-up easier and less time-consuming, making the results less ambiguous, and sometimes also reducing run time during simulations.

In typical embodiments, the invention provides a method for assessing at least one float remaining figure for at least one pattern of features (e.g., to assess how well multiple patterns of features fit). Typically (but not in all implementations), the method includes steps of determining the size and location of simulated or manufactured features of a pattern (or two or more patterns), determining a pattern construct indicative of the features of the pattern (including by determining a float remaining figure having size indicative of float remaining in the pattern). Until the present invention, such a float remaining figure had not been employed. Some such methods may be hand-implemented, others may be implemented by a programmed computer (or other processing system), and others may be implemented in hardware or firmware. By determining a float remaining figure for a pattern of features (e.g., holes) during or shortly after a manufacturing process, or determining such a figure by simulation of the design, it is possible to determine how the features will interact with patterns of features (e.g., pins)

on other parts. In some embodiments, the method may be implemented by a programmed computer. Other aspects of the invention are computer-readable media (e.g., compact disks or tapes) that store code for programming a processor to implement any embodiment of the inventive method, and computer systems programmed to perform any embodiment of the inventive method.

An aspect of the invention is a method including a step of determining a float remaining figure having size that is indicative of float remaining in a manufactured pattern (e.g., a simulated manufactured pattern or an actually manufactured pattern) of features. Typical ones of such embodiments use the data to assess a float remaining figure for the pattern, rather than manipulating and performing calculations on data indicative of multiple features (e.g., holes or pins) of the pattern. In some embodiments, the size and relative location of two or more float remaining figures, each for a different part (each part typically designed to embody different pattern of features), are compared and transformed (preferably in accordance with simple math and geometry operations) to provide a quantifiable measure of how well the two parts fit.

By determining a float remaining figure in a simulation, design requirements can be established for mating parts and the assembly freedom between parts can be predicted. By determining a float remaining figure for a pattern of features such as holes during or shortly after a manufacturing process, quality of assembly with other parts can be determined in advance of assembly. Furthermore, the data collected from each analysis of a part may be used to determine algorithms to predict future remaining feature tolerances.

Various methods are described in above-referenced application Ser. Nos. 10/792,089 and 10/800,383 for performing combined feature dimensional parameter analysis (e.g., evaluation of pattern compliance for an actually manufactured or simulated article), and dimensional parameter analysis of an individual feature of a pattern. Some such methods (e.g., some of the methods described in U.S. application Ser. No. 10/792,089) employ information about the actual shape of each manufactured feature (e.g., data indicative of a multitude of selected surface points of each manufactured or simulated feature); others (e.g., some of the methods described in U.S. application Ser. No. 10/800,383) require information about the size and position but not the actual shape of each manufactured or simulated feature. Some embodiments of the method of the present invention include at least some steps performed in accordance with the teaching of above-referenced U.S. application Nos. 10/792,089 and 10/800,383.

Figure 2:
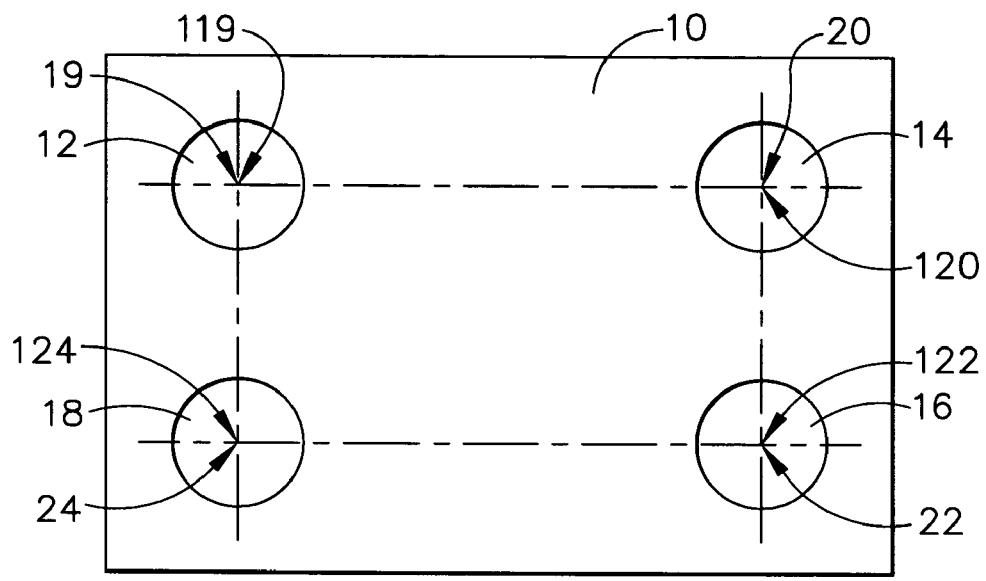
FIG. 2 is a diagram illustrating the designed features for a rectangular plate having four holes, which can be used in accordance with an aspect of the present invention.

FIG. 2 is a diagram of designed features of an object, which can be a part and will be referred to below as a part. Part design 10 of FIG. 2 is a design for a rectangular plate having features including four spaced-apart circular holes 12, 14, 16, 18. While circular holes are used in the example, a feature may also be, but not limited to, polygonal or oval. Each of the designed circular holes 12, 14, 16, 18 has a center, referred to as true center 19, 20, 22, 24, respectively, and a designed size, referred to as a true size. Each hole 12, 14, 16, 18 has a designed position (referred to as a true position) in design 10. Multiple points on a feature may be used to track the position of a feature between the feature's designed (true) position and the feature's manufactured position. For example, for a rectangular hole, points on the surface of the sides and at the corners may be used or the center of the rectangle may be used. For a circular hole, the center of the hole may be used. True centers 19, 20, 22, 24 may be used as the true positions 119, 120, 122, 124 of holes 12, 14, 16, 18, respectively. A computer aided drafting (CAD) system can be used to render the diagram. The information regarding holes 12, 14, 16, and 18 may be determined by digital data stored on a machine-readable medium (e.g., a hard drive or optical disk), and can be processed by an appropriately programmed computer.

Figure 3:
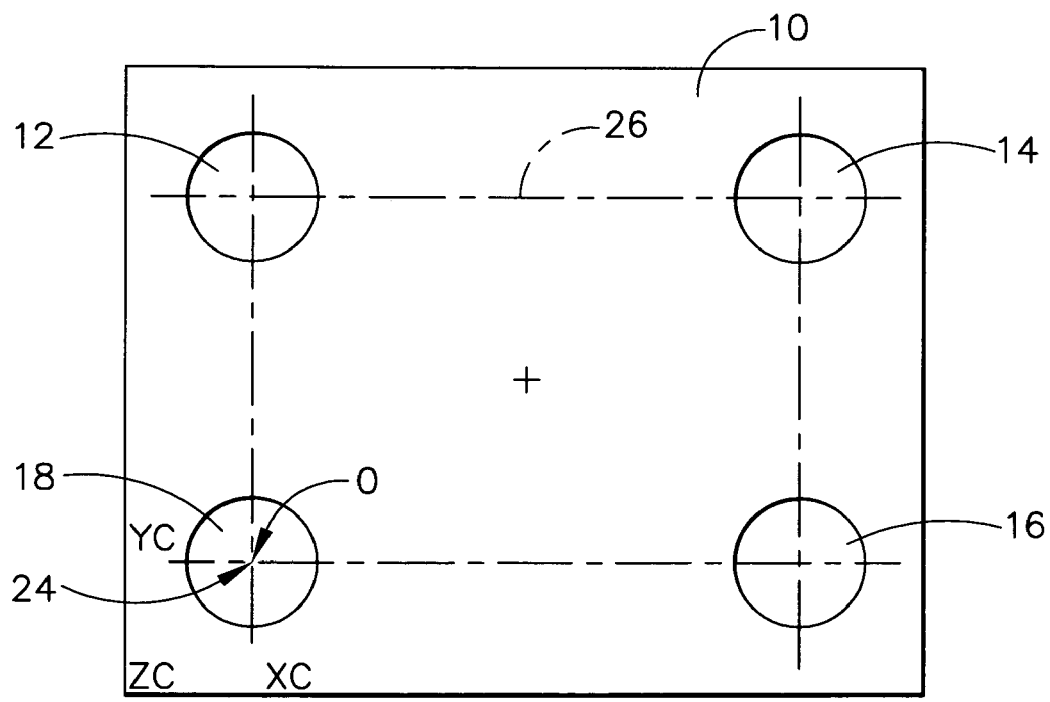
FIG. 3 is a diagram illustrating the feature related tolerance zone framework (FRTZF) for the rectangular plate in FIG. 2, which can be used in accordance with an aspect of the present invention.

In FIG. 3, frame 26 is determined by a feature related tolerance zone framework (FRTZF) for design 10 of FIG. 2. Frame 26 will sometimes be referred to below as "FRTZF 26." An FRTZF provides relational information that accounts for the tolerances of each feature, and the relation between the tolerances of each feature in relation to a whole pattern of features. In a typical case, a four-pin plate having four pins (or another plate having four holes) is to be mated to the rectangular plate having design 10, with the four pins inserted into holes 12, 14, 16, and 18 (or the hole patterns aligned and fasteners passed through both parts. An FRTZF for the design 10 would provide the maximum tolerances that if exceeded, would prevent the features in the two parts from aligning. An xyz coordinate system for the FRTZF may use the center 24 of the bottom left circle 18 as the origin 0, and the true positions 119, 120, 122 of the other circles 12, 14, 16 as reference points (FIG. 2).

Figure 4:
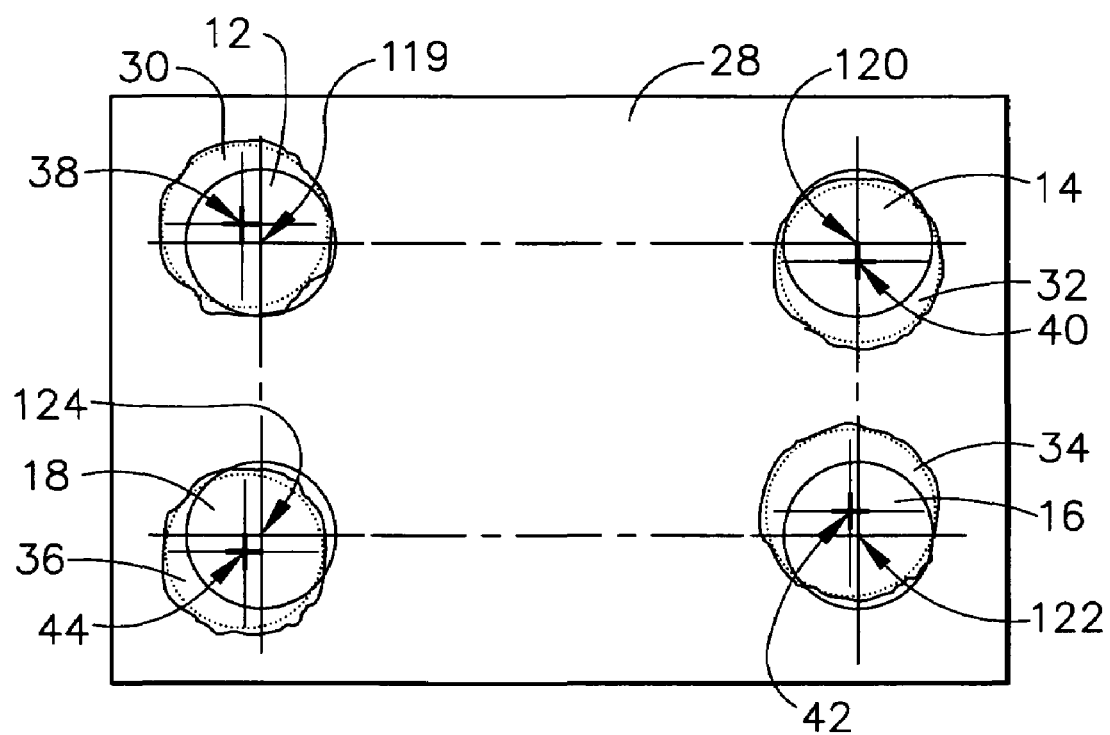
FIG. 4 is a diagram illustrating a manufactured rectangular plate, which can be used in accordance with an aspect of the present invention.

FIG. 4 is a diagram illustrating manufactured rectangular plate 28 created from design 10 of FIG. 2. The manufactured holes 30, 32, 34, and 36 correspond to designed holes 12, 14, 16 and 18. Manufactured rectangular plate 28 can be a real-world manufactured plate or a simulated manufactured plate. Manufactured holes 30, 32, 34, and 36 can represent real-world or simulated manufactured holes. Simulated holes may be generated to provide a variation analysis model of a rectangular plate. Manufactured holes 30, 32, 34, and 36 typically exhibit variation from the true size and location determined by design 10. Designed holes 12, 14, 16 and 18 define where manufacture holes 30, 32, 34, and 36 are supposed to be. As shown in FIG. 4, each manufactured hole 30, 32, 34, 36 has deviated from the true size as well as the true position. A manufactured hole that deviates from true size may be larger or smaller than the designed hole and/or may have a shape different from that of the designed hole (e.g., a shape with inner surface irregularity or roughness, where the designed hole has a smooth cylindrical surface). Each manufactured hole may have a positional error relative to its true position. The positional error may be determined by the distance between center 38, 40, 42, 44 of each manufactured hole 30, 32, 34, 36 and the true positions 119, 120, 122, 124, respectively. The deviations may extend along the depth of each hole. Data regarding the dimensions and position of the manufactured rectangular plate 28 may be acquired by many methods known in the art, including, but not limited to, examining the plate 28 with a device such as a coordinate measuring machine.

Figure 5:
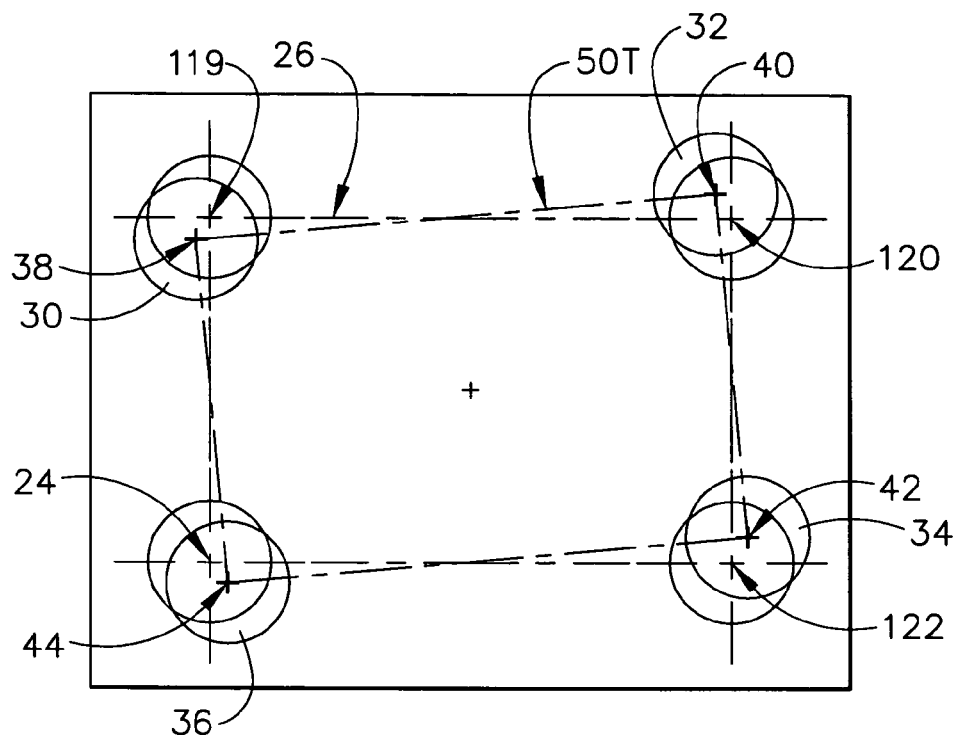
FIG. 5 is a diagram illustrating the positional errors and true positions of each manufactured hole of FIG. 4 relative to a trial best fit framework, which can be used in accordance with an aspect of the present invention.

FIG. 5 is a diagram illustrating the positional errors of each manufactured hole 30, 32, 34, 36 and the true positions 119, 120, 122, 124 of each hole of design 10, relative to a trial best fit tolerance zone framework (best fit framework) 50T. Framework 50T of FIG. 5 is a rotated and translated version of FRTZF 26 which is positioned to fit well with centers 38, 40, 42, and 44 of manufactured holes 30, 32, 34, and 36. A best fit framework 50 (shown in FIG. 6) can be determined by best fitting FRTZF 26 to the manufactured holes 30, 32, 34, 36, e.g., by best fitting the true positions 19, 20, 22, 24 to the centers 38, 40, 42, 44 of manufactured holes 30, 32, 34, 36, while retaining the structure of the FRTZF 26. Examples of best fit methods are well known in the art and include, but are not limited to, a least squares or total least squares method. The best fit of the FRTZF 26 may be a version of FRTZF 26 that has translated and/or rotated relative to the FRTZF's original position, resulting in best fit framework 50.

Figure 6:
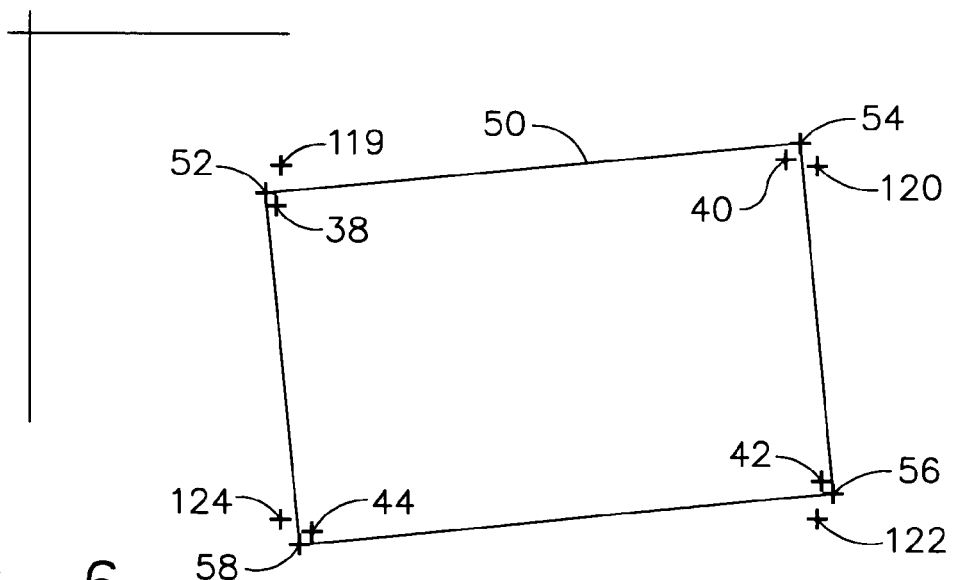
FIG. 6 is a diagram illustrating the true positions and the centers of each manufactured hole of FIG. 4 relative to a best fit framework, which can be used in accordance with an aspect of the present invention.

FIG. 6 is a diagram illustrating the true positions 119, 120, 122, 124 of each hole of design 10 and the centers 38, 40, 42, 44 of each manufactured hole relative to best fit framework 50. The best fit framework 50 establishes transformed true positions for each hole, where each transformed true position 52, 54, 56, 58 represents a true position 119, 120, 122, 124, respectively, that has rotated and/or translated with the FRTZF 26 (FIG. 5) when producing the best fit framework 50. Comparing best fit framework 50 with FRTZF 26 indicates how much the holes of pattern 10 have transformed, e.g., translated and rotated. The translation and rotation of a pattern of features may be evaluated relative to an origin located at, but not limited to, a true position of a circle, an edge of the manufactured part, a corner of a manufactured part, and a location on a part to be mated with the manufactured part.

Figure 7:
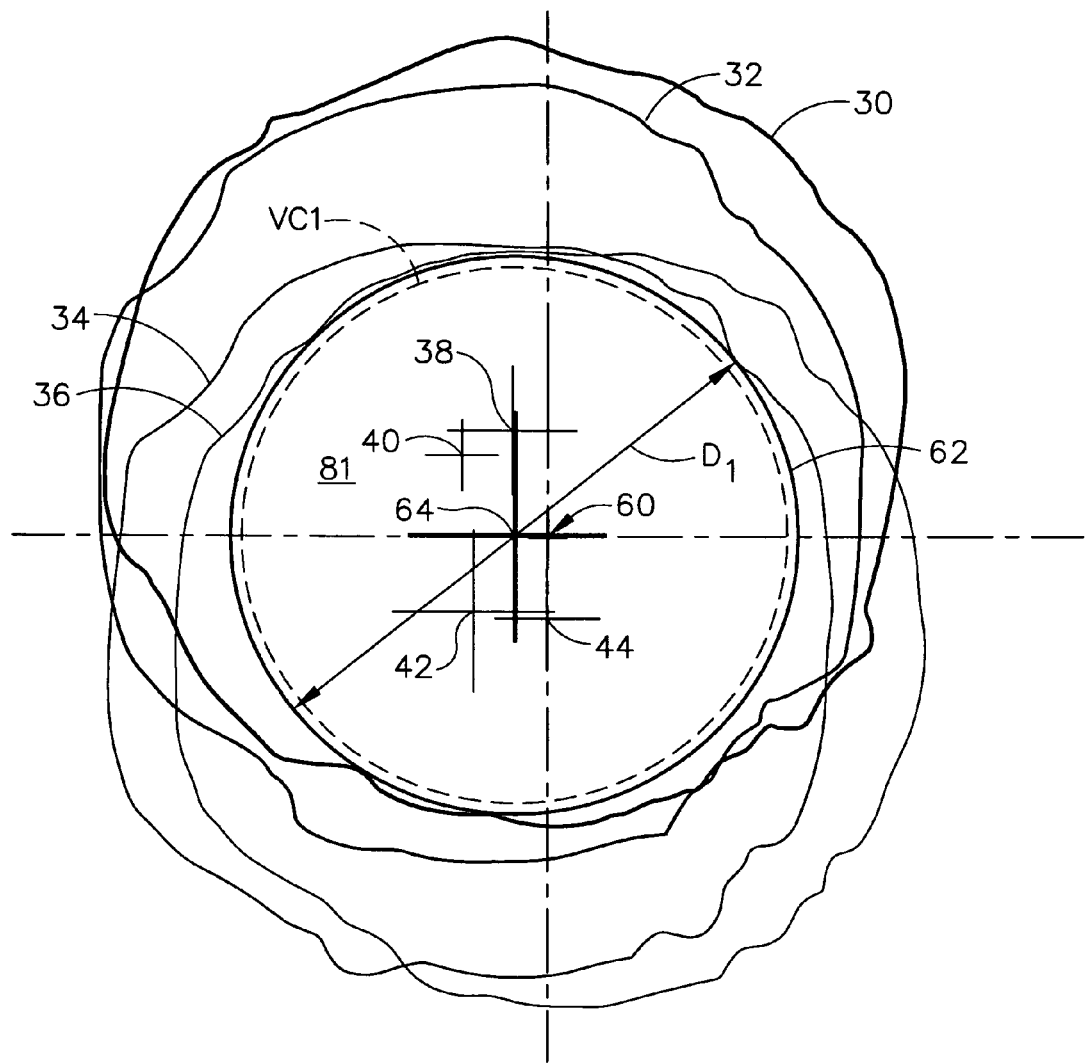
FIG. 7 is a diagram illustrating a construct indicative of a one true position and manufactured holes relative to the one true position, which can be generated in accordance with an aspect of the present invention.

FIG. 7 is a diagram illustrating an alignment, employed in some embodiments of the invention, indicative of the relationship between each of manufactured holes 30, 32, 34, 36 and "one true position" 60. One true position 60 is a single association determined by superimposing each of transformed true positions 52, 54, 56, 58 (FIG. 6) of the best fit framework 50 onto each other. In FIG. 7, the surface of each of manufactured holes 30, 32, 34, 36 (and the center 38, 40, 42, or 44 of each of holes 30, 32, 34, and 36) respectively has the same relation to one true position 60 that it does to the corresponding one of transformed true positions 52, 54, 56, and 58 in FIG. 6. The dimensions of manufactured holes 30, 32, 34 and 36 may be determined by selecting a number (typically a large number) of points on the surface of each hole 30, 32, 34, and 36, and determining the dimensions from the selected points. The center of each manufactured hole may be established first. A circle 62 (having center 64) having the largest possible diameter is inscribed within the area 81 defined within (and common to) all of the manufactured holes 30, 32, 34, 36. The position of inscribed circle 62's center 64 relative to the one true position 60 determines the amount of translation of the pattern of features relative to the best fit framework 50 (shown in FIG. 6). The difference between the diameter $D_1$ of the inscribed circle 62 and a virtual condition is a remaining allowable feature relating tolerance for the pattern of holes as a group. The virtual condition can be represented as a circle (e.g., circle Vc1 of FIG. 7) having a diameter determined by the collective effects of a feature's specified maximum material condition (MMC) or least material condition (LMC) for a feature (or each feature of a pattern) and a specified geometric tolerance for that material condition. For a hole, the virtual condition is typically equal to the MMC (the smallest size that the hole may be) minus the positional tolerance for that hole. MMC may be defined as the condition in which a feature of size contains the maximum amount of material within the stated limits of size-for example, the minimum hole diameter for a hole. LMC may be defined as the condition in which a feature of size contains the least amount of material within the stated limits of size, for example, maximum hole diameter for a hole.

Figure 8:
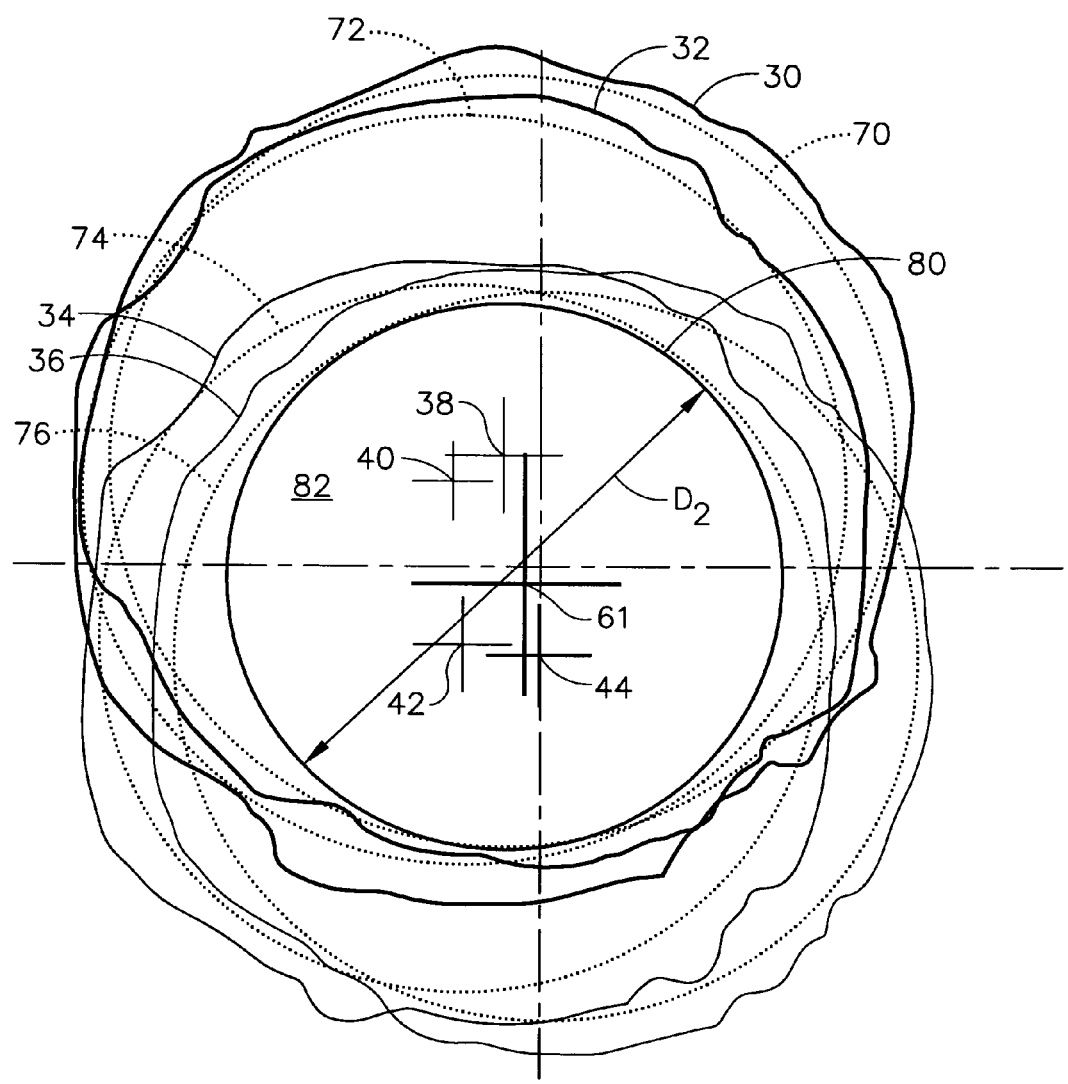
FIG. 8 is a diagram illustrating inscribed circles, manufactured holes and a one true position, which can be generated in accordance with an aspect of the present invention.

FIG. 8 is a diagram illustrating an alignment, employed in some embodiments of the invention, using inscribed circles 70, 72, 74, 76 for each manufactured hole 30, 32, 34, 36 to find a maximum inscribed circle 80. Similar to the procedure described with reference to FIG. 7, a one true position 60 is determined by superimposing each of the transformed true positions 52, 54, 56, 58 of the best fit framework 50 (of FIG. 6) onto each other. The surface (and center) of each of manufactured holes 30, 32, 34, 36 is represented relative to the one true center. A circle 70, 72, 74, 76 having the largest possible diameter is inscribed within each of the so-aligned manufactured holes 30, 32, 34, 36, respectively. Centers 38, 40, 42, 44 of holes 30, 32, 34, 36 are located at the centers of circles 70, 72, 74, 76. A circle 80 having a maximum diameter is then inscribed within the area 82 defined by (common to) inscribed circles 70, 72, 74, and 76 as shown in FIG. 8. The position of inscribed circle 80's center 61 relative to the one true position 60 determines the amount of translation of the pattern of features relative to the best fit framework 50. The difference between the diameter $D_2$ of inscribed circle 80 and the virtual condition (Vc) equals the remaining allowable feature relating tolerance.

Figure 9:
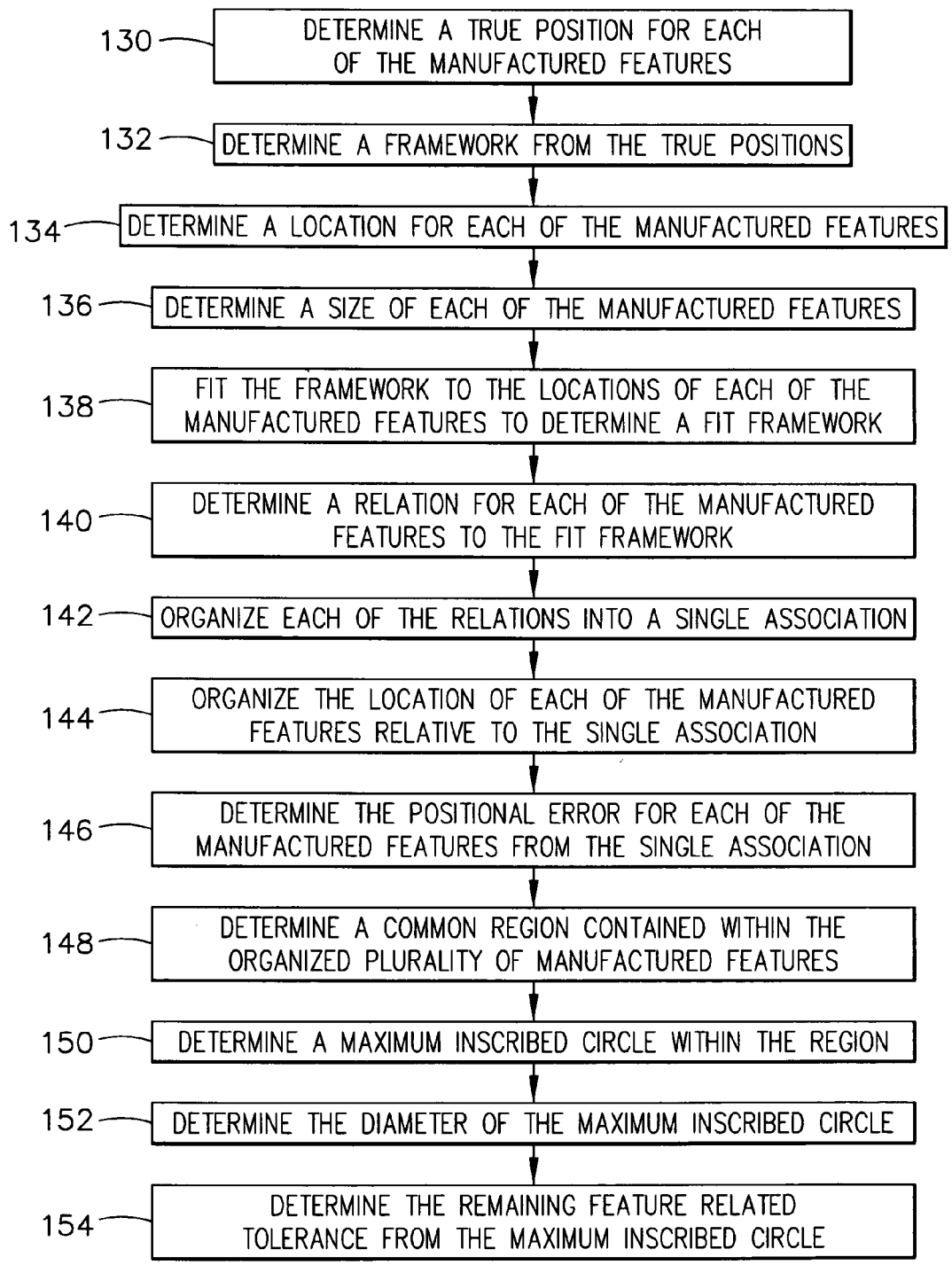
FIG. 9 is a flowchart illustrating a method for determining the positional error and remaining feature related tolerance for a pattern of internal features on an object, in accordance with an aspect of the present invention.

FIG. 9 is a flowchart of steps employed in some embodiments of the inventive method for determining positional error and remaining feature related tolerance for a pattern of features on an object. In the FIG. 9 embodiments, positional error and remaining feature related tolerance for a pattern of internal features are determined by a step (130) of determining a true position (i.e., an ideal position predetermined by a design) for each of the manufactured features. An example of step 130 is found in the description of FIG. 3. The FIG. 9 embodiments also include a step (132) of determining a framework from the true positions. An example of step 132 is found in the description of FIG. 4. The FIG. 9 embodiments also include a step (134) of determining a location (i.e., an actual or simulated position) for each of the manufactured features. An example of step 134 is found in the description of FIG. 4. The FIG. 9 embodiments also include a step (136) of determining a size of each of the manufactured features. An example of step 136 is found in the description of FIG. 4. The FIG. 9 embodiments also include a step (138) of fitting the framework to the locations (determined in step 134) of each of the manufactured features to determine a fit framework. An example of step 138 is found in the description of FIGS. 5 and 6.

The FIG. 9 embodiments also include a step (140) of determining a relation for each of the manufactured features to the fit framework, a step (142) of organizing each of the relations into a single association, and a step (144) of organizing the location of each of the manufactured features relative to the single association. An example of steps 140, 142, and 144 is found in the description of FIGS. 5–7. The FIG. 9 embodiments also include a step (146) of determining a positional error for the manufactured features from the single association. An example of step 146 is found in the description of FIG. 7. The FIG. 9 embodiments also include a step (148) of determining a common region contained within (common to) the organized plurality of manufactured features (organized relative to the single association). An example of step 148 is found in the description of FIG. 7. The FIG. 9 embodiments also include a step (150) of determining a maximum inscribed circle within the common region. An example of step 150 is found in the description of FIG. 7. The FIG. 9 embodiments also include a step (152) of determining the diameter of the maximum inscribed circle. An example of step 152 is found in the description of FIG. 7. The FIG. 9 embodiments also include a step (154) of determining a remaining feature related tolerance from the maximum inscribed circle. An example of step 154 is found in the description of FIG. 7.

Figure 10:
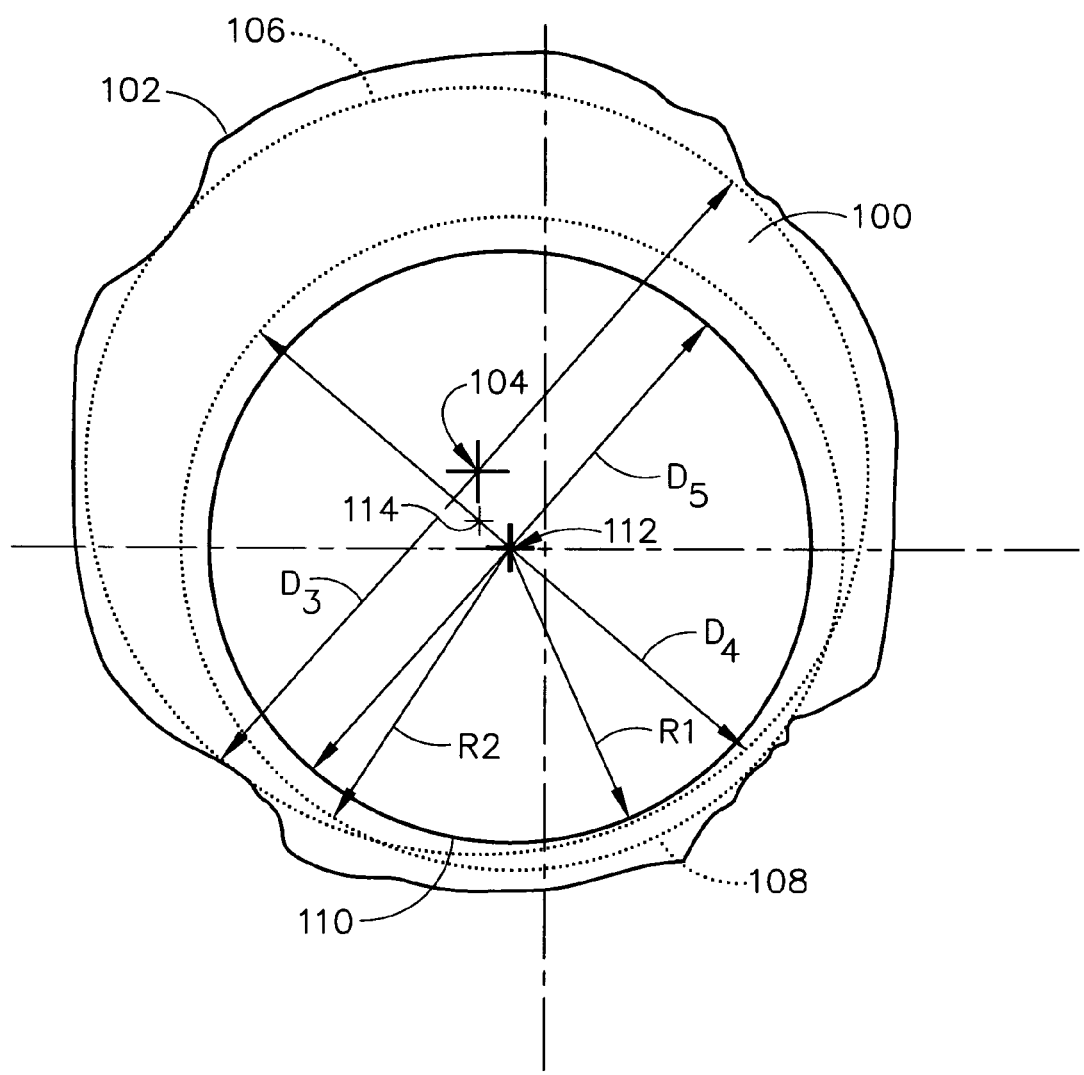
FIG. 10 is a diagram illustrating a construct indicative of an internal feature and a virtual condition, which can be generated in accordance with an aspect of the present invention.

FIG. 10 is a diagram illustrating an alignment, employed in some embodiments of the invention, in which a feature such as a hole 100 is evaluated on an individual basis to determine if the feature violates a virtual condition (and thus violates a feature relating tolerance), and if so, how the feature may be modified. Hole 100 has a feature surface 102 and a feature center 114. Circle 106 is inscribed within hole 100 with the maximum possible diameter. Virtual condition circle 108 representing the virtual condition may be drawn with a center 112 located at the same center as for the maximum inscribed circle 110 for the pattern. A maximum inscribed circle 110 for the pattern may also be represented. A maximum inscribed circle 110 for the pattern is a circle for the hole 100 that fits in the feature pattern. The feature 102 translation within the pattern is determined by calculating the positional difference between the maximum inscribed circle center 112 and the center 104 of inscribed circle 106 for the hole 100. Inscribing diameter $D_3$ represents the usable diameter of the hole 100 for a single fastener or mating part to be inserted within the hole 100 without consideration of any other features in the pattern. Diameter D5 represents the usable diameter of the pattern of holes in the part.

Still referring to FIG. 10, the maximum inscribed circle 110 for the pattern is smaller than the virtual condition circle 108, and thus one or more features violate the tolerance requirements of the virtual condition, resulting in interference between the hole and another object such as a fastener or mating part. The feature 102 also violates the Vc circle 108, thus also indicating a violation of the tolerance requirements. If the maximum inscribed circle 110 for the pattern is larger than the virtual condition circle 108 and does not intersect it, tolerances are met and there is clearance between the hole and another object such as a fastener or mating part. Causes for feature violations may include, but are not limited to, feature size, pattern translation and feature translation relative to the pattern. The combined total of all the feature violations is the difference between the diameter $D_5$ of the maximum inscribed circle for the pattern 110 and the diameter $D_4$ of the virtual condition circle 108.

Feature size and location may be altered to eliminate violations of the virtual condition. Feature size for the hole may be altered by first determining the difference between the minimum tangent radius R1 from center 112 to circle 106 and the virtual condition radius R2. The hole location may be altered along a vector between the circle 106 center 104 and the virtual condition center 112.

Figure 11:
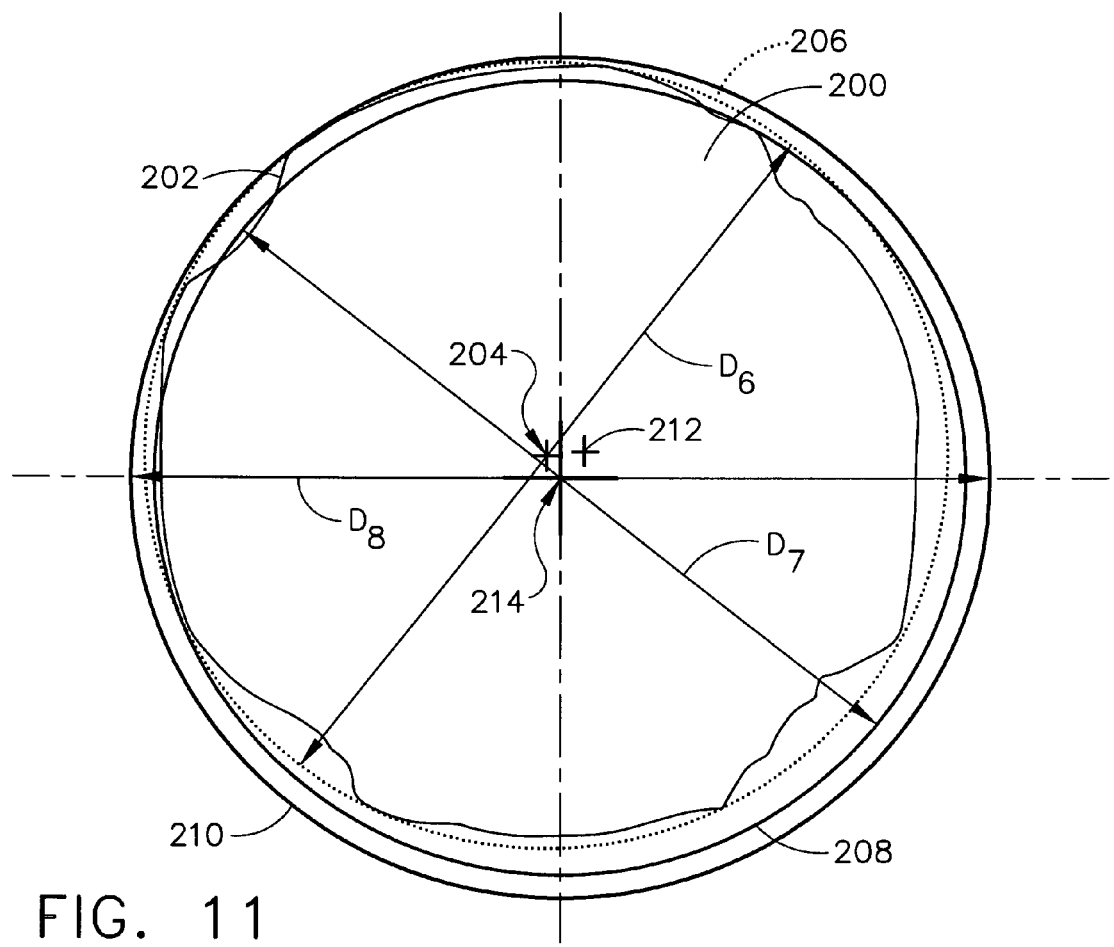
FIG. 11 is diagram illustrating a construct indicative of an external feature and a virtual condition, which can be generated in accordance with an aspect of the present invention.

FIG. 11 is a diagram illustrating an alignment, employed in some embodiments of the invention, in which a feature 200 (to be referred to as a pin) is evaluated on an individual basis to determine if the feature violates the virtual condition, and if so, how the feature may be modified. Pin 200 has a feature surface 202 and a feature center 204. Circle 206 is the circle circumscribed about pin 200 that has the minimum possible diameter. A minimum circumscribing circle 210 (centered at point 214) for the pattern is also determined. Minimum circumscribing circle 210 for the pattern is a circle having minimum radius which circumscribes all manufactured features of the pattern (when they have been organized relative to one true position 212). A virtual condition circle 208 (whose center is also at point 214) representing a virtual condition is also determined. Position 212 of FIG. 11 is a one true position for the pattern (corresponding to one true position 60 of FIG. 7) which is a single association typically determined by superimposing each of transformed true positions of a best fit framework (corresponding to framework 50 of FIG. 6) for the pattern onto each other. The feature 202 translation within the pattern is determined by calculating the positional difference between the one true position 212 and the center 204 of circumscribing circle 206 for the pin 200. The diameter $D_6$ of the minimum circumscribing circle 206 represents the effective diameter of the pin 200 when inserted within a hole.

Still referring to FIG. 11, the minimum circumscribing circle 210 for the pattern is larger than the virtual condition circle 208, and thus one or more features violate the tolerance requirements of the virtual condition, resulting in interference between the pin 200 and the hole into which the pin 200 will be inserted. Causes for feature violations may include, but are not limited to, feature size, pattern translation and feature translation relative to the pattern. The combined total of all the feature violations is the difference between the diameter $D_8$ of the minimum circumscribing circle 210 for the pattern and the diameter $D_7$ of the virtual condition circle 208. Feature size and location may be altered to eliminate violations of the virtual condition. Feature size for pin 200 may be altered by first determining the interference between the pin surface 202 and the virtual condition circle 208. The pin 200 location may be altered by determining the pin location relative to the minimum circumscribing circle for the pattern 210 and then moving the pin location.

Figure 12:
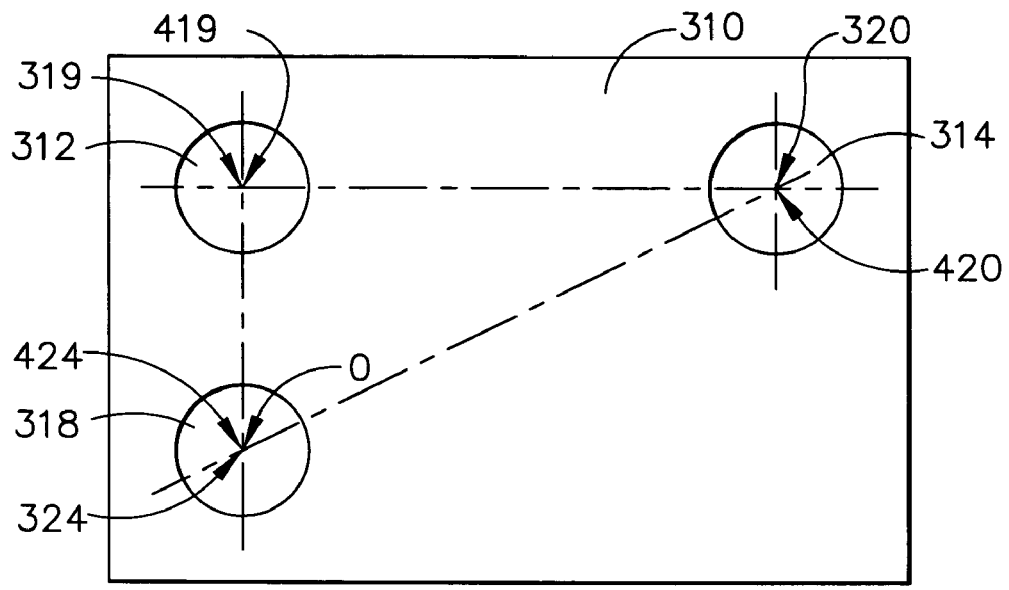
FIG. 12 is a diagram illustrating a designed rectangular plate, which can be used in accordance with an aspect of the present invention.

FIG. 12 is a diagram illustrating designed features for an object such as a part. The designed part may be a rectangular plate 310 having features including three spaced-apart circular holes 312, 314, and 318. The holes may have a cross-sectional shape, including but not limited to circular, oval or quadrilateral, but are shown with circular cross-sections in FIG. 12. Each of the designed circular holes 312, 314, 318 has a center, referred to as the true center 319, 320, 324, respectively, and a designed size, referred to as a true size. The designed size may be gauged using the diameter or area of the circle. Each hole 312, 314, 318 has a designed position on plate 310, referred to as a true position. The true centers 319, 320, 324 may be used as the true positions 419, 420, 424, of holes 312, 314, 318, respectively. One of the true centers (e.g., the true center 424 for the bottom left circle 324) may be used as the origin of a Cartesian coordinate system. A computer aided drafting (CAD) system may be used to render the diagram. The design information (including characterizations of circular holes 312, 314, and 318) may be indicated by digital data, which can be stored on a machine-readable medium (e.g., a hard drive or an optical disk) and processed on a computer.

Figure 13:
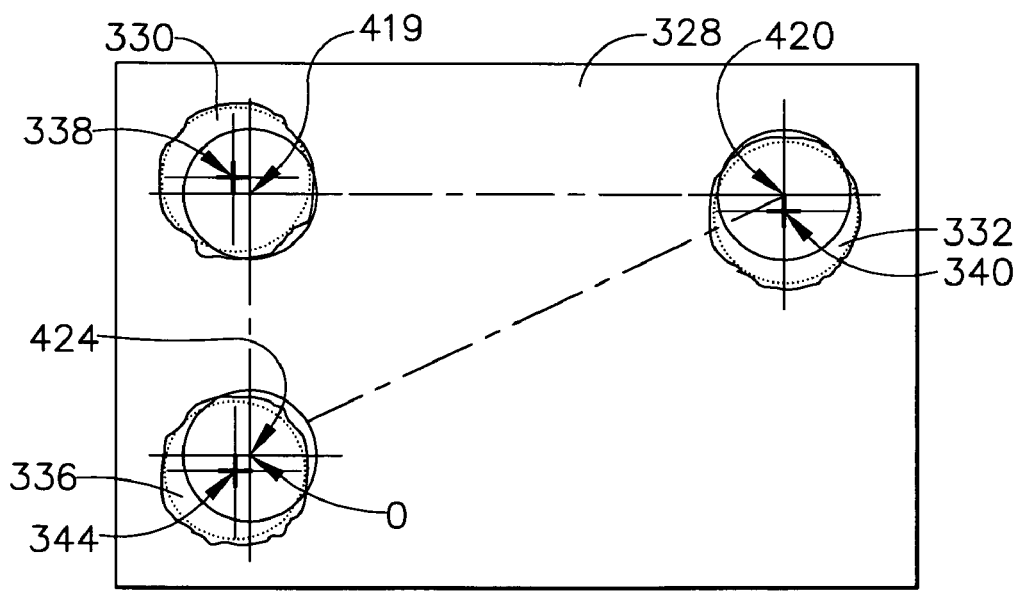
FIG. 13 is a diagram illustrating a manufactured rectangular plate having the FIG. 12 design, which can be used in accordance with an aspect of the present invention.

FIG. 13 is a diagram illustrating a manufactured rectangular plate 328, created from the design described with reference to FIG. 12. The manufactured holes 330, 332, and 336 correspond to designed holes 312, 314 and 318. Manufactured rectangular plate 328 may be a simulation of an actually manufactured plate, in which case manufactured holes 330, 332, and 336 are simulated manufactured holes. The simulated holes may be generated to provide a variation analysis model of a rectangular plate. Each manufactured hole 330, 332, 336 has deviated from the true size as well as the true position. A true size deviation may indicate a hole larger or smaller than designed. Each manufactured hole may have a positional error relative to its true position. The positional error may be determined by the distance between the center 338, 340, 344 of each manufactured hole 330, 334, 336 and its true position 419, 420, 424, respectively. The deviations may extend along the depth of each hole. Data regarding the dimensions and position of the manufactured rectangular plate 328 may be acquired by many methods known in the art, including, but not limited to, examining the rectangular plate 328 with a coordinate measuring machine.

Figure 14:
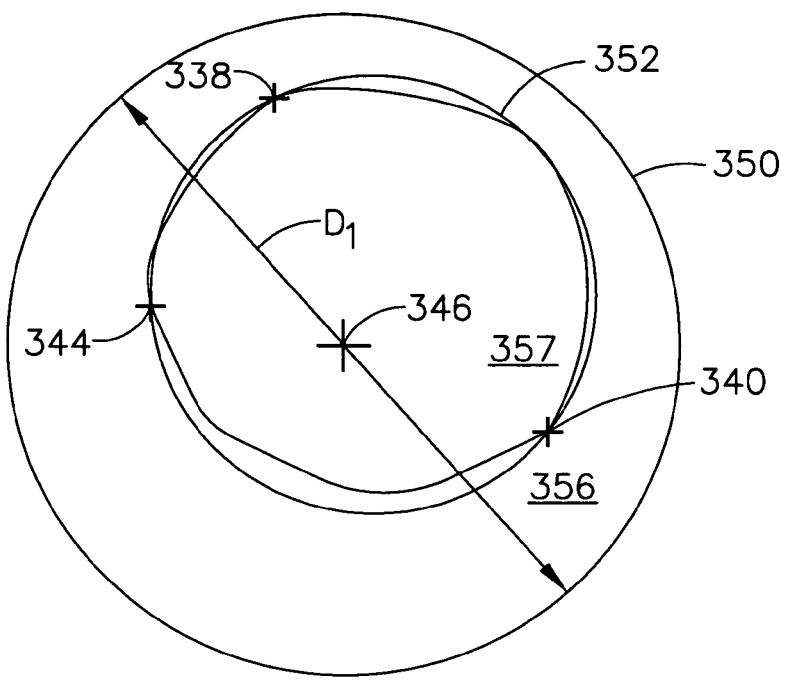
FIG. 14 is a diagram of centers of the manufactured holes of FIG. 13 relative to a one true position, a pattern locating tolerance zone about the one true position, and a feature relating circle, which can be used in accordance with an aspect of the present invention.

FIG. 14 is a diagram, generated in accordance with an aspect of the present invention, illustrating the centers 338, 340, 344 of each manufactured hole of FIG. 13 relative to a one true position 346. The one true position 346 represents the true positions of manufactured holes 330, 332, 336 as a single point. The one true position 346 may be a superimposition of true positions 419, 420, 424. Each of centers 338, 340, 344 of the manufactured hole has the same relative position to the one true position 346 as it does to its true position 419, 420, or 424 (FIG. 13), respectively. The one true position 346 may be represented as the arbitrarily-positioned origin of a coordinate system (e.g., an x, y coordinate system), and in this coordinate system the centers 338, 340, 344 of the manufactured holes are determined with respect to the one true position 346.

FIG. 14 also illustrates a circle 350 that represents the pattern locating tolerance zone (PLTZ) whose center is the one true position 346. A PLTZ is a tolerance zone that may be specified in the design data. The PLTZ specifies the positional tolerance for a group of features. In FIG. 14, the diameter $D_1$ of circle 350 represents the PLTZ. FIG. 14 also shows a feature relating circle 352 that intersects or includes each of the centers 338, 340, 344, positioned as described relative to one true position 346. The feature relating circle 352 indicates a range of how the positions of manufactured holes 330, 332, 336 (FIG. 13) deviate from the one true position 346, and thus, feature relating circle 352 provides an accurate indicator of the deviations of the manufactured holes 330, 332, 336 from the designed pattern. The perimeter of the feature relating circle 352 indicates the maximum deviation of the manufactured holes 330, 332, 336 and the amount of tolerances consumed. Region 356 outside of feature relating circle 352 indicates an allowable positional error relative to the pattern of features that is greater than any of the positional errors of manufactured holes 330, 332, and 336. Region 357 within feature relating circle 352 indicates a positional error relative to the pattern of features that is already consumed by the combined positional errors of manufactured holes 330, 332, 336.

Feature relating figures (e.g., circle 352 of FIG. 14) can be employed in a variety of ways in accordance with various aspects of the present invention, including those described in above-referenced U.S. application Ser. No. 10/800,383.

Figure 15:
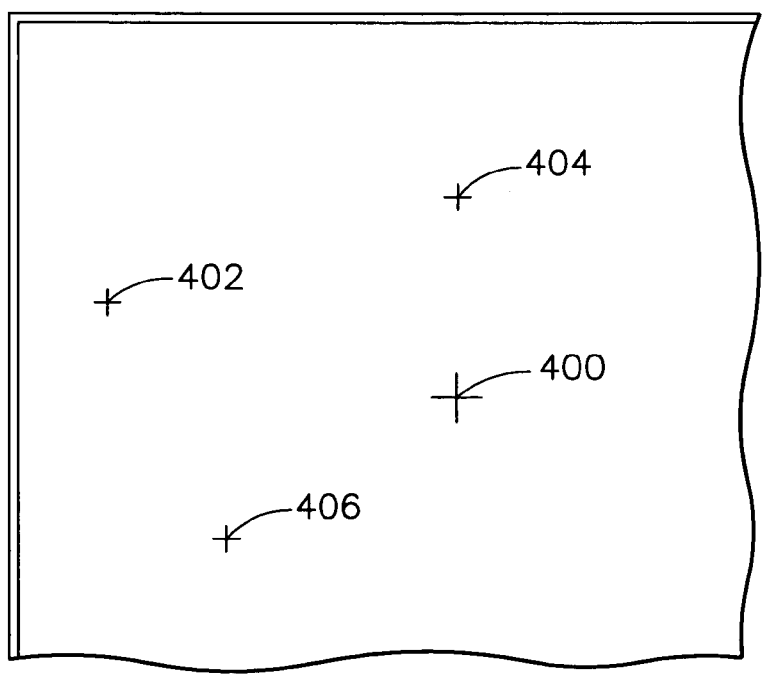
FIG. 15 is a diagram of centers of manufactured holes relative to a one true position, which can be used in accordance with an aspect of the present invention.
Figure 16:
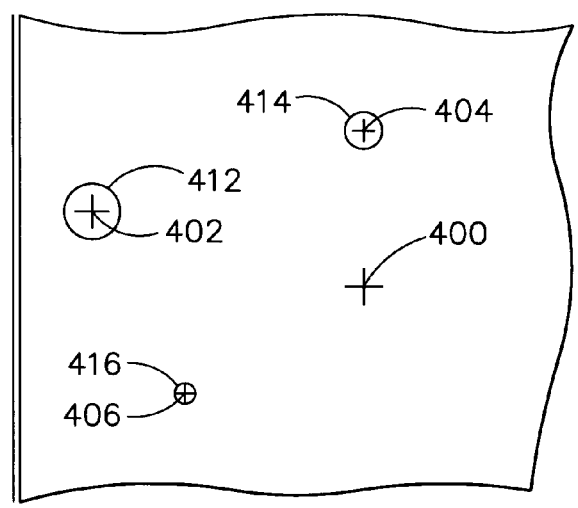
FIG. 16 is a diagram illustrating a material condition for each hole center of FIG. 15, which can be used in accordance with an aspect of the present invention.
Figure 17:
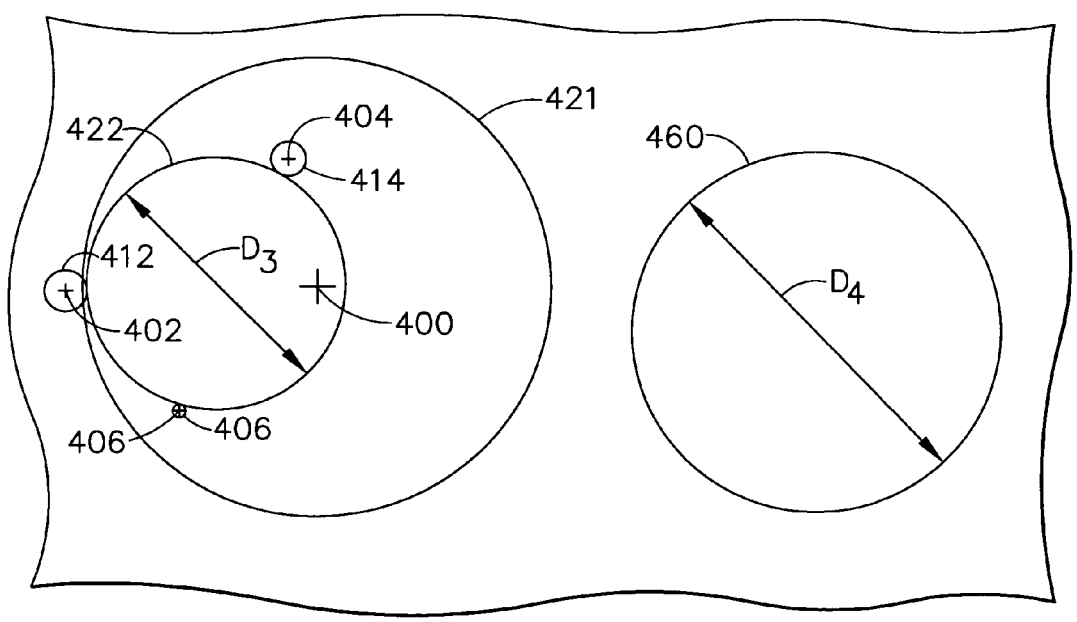
FIG. 17 is a diagram of constructs generated to determine a feature relating tolerance for the pattern in FIG. 16, which can be used in accordance with an aspect of the present invention.

An aspect of the present invention is to determine (and employ constructs indicative of) the used or consumed tolerance for any object having a pattern of features. The following description of FIGS. 15–17 provides an example of such a construct. FIG. 15 is a diagram illustrating manufactured feature centers 402, 404 and 406 of manufactured features (e.g., manufactured holes or other manufactured internal features) of an object (e.g., a rectangular plate) relative to a one true position 400 for the object. The one true position 346 (FIG. 14) corresponds functionally to above-described one true position 346, and may be a superimposition of true positions of the manufactured features.

FIG. 16 is a diagram in which "departure circles" 412, 414 and 416, for feature centers 402, 404 and 406, respectively, represent the size departure of each manufactured feature relative to its true size. The positions of departure circles 412, 414, and 416 relative to one true position 400 indicate a range of deviations of the positions of the manufactured features from their true positions. The diameter of the departure circle for an internal feature (e.g., a hole) may be indicative of the difference in diameter from the minimum hole diameter allowable for the feature in a pattern. The diameter of the departure circle for an external feature (e.g., a pin) may be indicative of the difference in diameter from the maximum allowable diameter for the feature in a pattern.

FIG. 17 is a diagram illustrating constructs generated using the FIG. 16 construct, including a PLTZ and a construct indicative of consumed tolerance for the object indicated by FIG. 16. In FIG. 17, the PLTZ is indicated by the diameter of circle 421, which is centered about the one true position 400. The PLTZ is not violated if the PLTZ circle 421 is tangent to, intersects, or contains the departure circles 412, 414, and 416.

Still referring to FIG. 17, the used tolerance of the holes corresponding to hole centers 402, 404 and 406 may be derived by a used feature relating circle 422 (sometimes referred to herein as a consumed tolerance circle), which is a circle having minimum diameter that is tangent to each departure circle 412, 414 and 416. When a used feature relating circle (e.g., circle 422) is tangent to the near side of each departure circle (e.g., 412, 414 and 416), each departure circle 412, 414 and 416 lies outside of the used feature relating circle. The diameter $D_3$ of consumed tolerance circle 422 may be compared with the diameter $D_4$ of an allowable tolerance circle (e.g., allowable tolerance circle 460) that represents allowable feature relating tolerance. If diameter $D_3$ is greater than diameter $D_4$ then the pattern of internal features having centers 402, 404 and 406 (and the size departures indicated by FIG. 17) exceeds the allowable tolerances.

Figure 18:
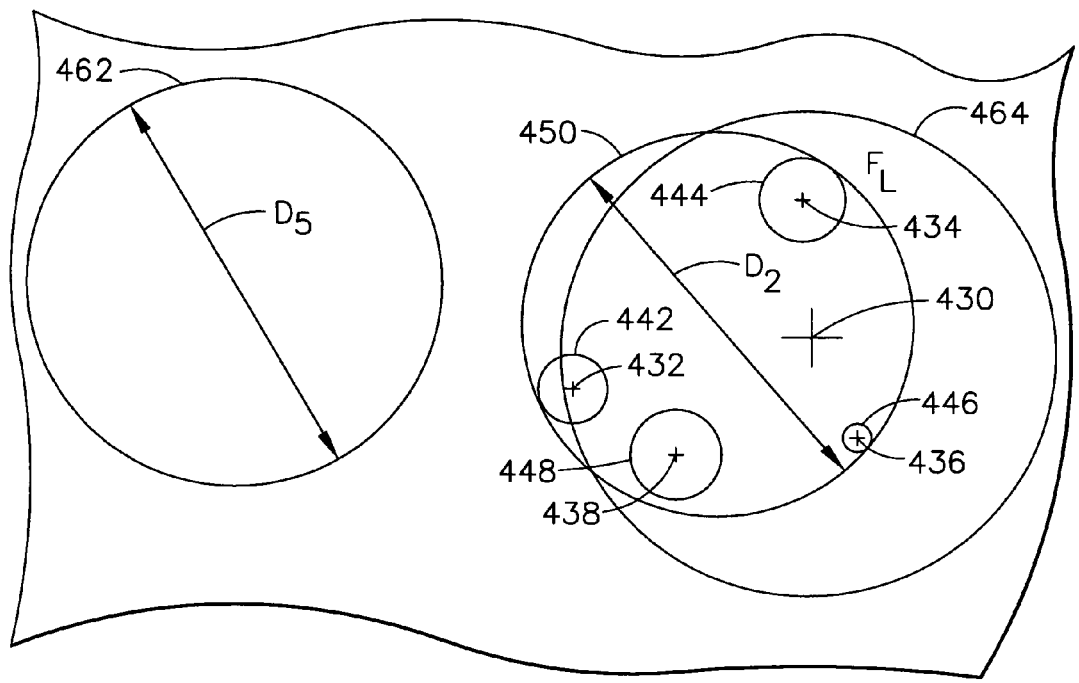
FIG. 18 is a diagram of constructs generated to determine a feature relating tolerance, which can be used in accordance with an aspect of the present invention.

FIG. 18 is a diagram illustrating centers 432, 434, 436, 438 of four manufactured (e.g., simulated) external features (e.g., pins) relative to a one true position 430. The one true position 430 corresponds functionally to above-described one true position 346, and may be a superimposition of true positions of the manufactured features. A departure circle (one of departure circles 442, 444, 446, 448) is defined about the center (432, 434, 436, or 438) of each external feature. Similar to the method described with reference to FIG. 17, a PLTZ may be represented by a PLTZ circle 464 centered about the one true position 430. The PLTZ is not violated if all of each of the departure circles 442, 444, 446, 448 lies within the PLTZ circle 464.

Still referring to FIG. 18, a used tolerance circle 450 may be drawn that is the smallest circle that contains all of the departure circles 442, 444, 446, 448. Typically, a used tolerance circle (as employed in accordance with some embodiments of the invention) is tangent to the outside of some of the departure circles (as circle 450 is tangent to each of departure circles 442, 444, and 446 in FIG. 18). The diameter $D_2$ of the used tolerance circle 450 may be compared to with the diameter $D_5$ of an allowable tolerance circle 462 to determine the remaining allowable tolerance. If the diameter $D_2$ of the used tolerance circle 450 is smaller than the diameter $D_5$ of the allowable tolerance circle 462, then the pattern of external features is within the allowable tolerance.

An aspect of the present invention is a method that includes the step of determining a float remaining figure which is indicative of float remaining in a manufactured pattern (e.g., a simulated manufactured pattern or an actually manufactured pattern) of features. The float remaining in the manufactured pattern is the minimum remaining clearance in any direction for the pattern, assuming that some of the pattern's predetermined allowable clearance has been consumed by the manufacturing process. In some such embodiments, the float remaining figure is a circle, sometimes referred to herein as a "float remaining" or "$F_R$ circle." The diameter of an $F_R$ circle for a manufactured pattern is indicative of remaining clearance (that is a function of positional tolerance, size tolerance, positional variation and size variation) of the pattern. To use an $F_R$ circle in accordance with an aspect of the invention, its center position is determined by a construct indicative of consumed tolerances of the pattern (e.g., the center of the $F_R$ circle is the center of a feature-relating tolerance consumed circle of the type described in above-referenced U.S. application Ser. No. 10/800,383 (e.g., circle 122 of FIG. 12 of U.S. application Ser. No. 10/800,383), or the center of a maximum inscribed circle of the type described in above-referenced U.S. application Ser. No. 10/792,089).

Figure 19:
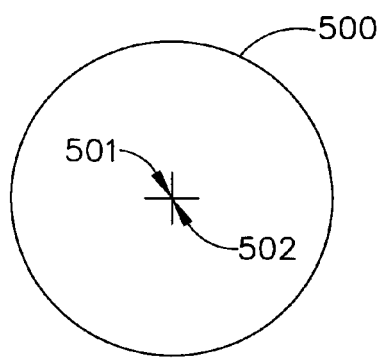
FIG. 19 is a diagram of a float remaining circle generated in accordance with an aspect of the invention.

In a very simple case (for a pattern of identically-sized holes that conforms exactly to its design), the diameter of an $F_R$ circle for the pattern (e.g., $F_R$ circle 500 of FIG. 19) is the difference between the nominal diameter of each hole of the pattern and the nominal diameter of each pin of a complementary pattern of identically-sized pins designed to mate with the holes of the pattern. This example assumes that the centers of the manufactured holes exhibit no deviation from their nominal locations. Thus, when using $F_R$ circle 500 in typical embodiments of the invention, the center 501 of the $F_R$ circle is aligned (in a construct indicative of consumed tolerances of the pattern) with a point 502 indicative of superimposed centers of the holes, as shown in FIG. 19.

For simulated or manufactured patterns, concepts discussed above with reference to FIGS. 2–18 and in U.S. applications Ser. No. 10/792,089 and Ser. No. 10/800,383 can be employed with float remaining figures determined in accordance with an aspect of the present invention to measure changes in available (remaining) float due to feature-to-feature position deviations and size variation, for both real-world and simulated parts. For example, concepts discussed above with reference to FIGS. 2–18 and in U.S. applications Ser. No. 10/792,089 and Ser. No. 10/800,383 can be employed to determine a center of deviation for a manufactured pattern (e.g., point 512 of FIG. 20), and a float remaining figure (e.g., $F_R$ circle 510 of FIG. 20, whose center is point 511) can be positioned relative to such center of deviation. Simple math determines the magnitude to be assigned to an $F_R$ figure (e.g., a diameter to be assigned to an $F_R$ circle) centered at the derived position.

Figure 20:
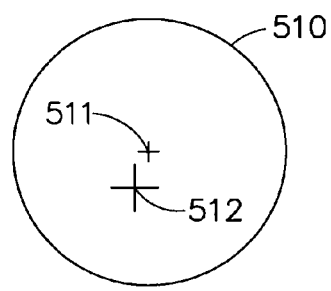
FIG. 20 is a diagram of another float remaining circle generated in accordance with an aspect of the invention.

As an example, consider the case that point 512 of FIG. 20 is the one true position 400 of above-described FIG. 17 (which can be the superimposition of true positions of the features of the pattern described above with reference to FIGS. 16 and 17), and that $F_R$ circle 510 of FIG. 20 is indicative of the pattern described above with reference to FIGS. 16 and 17. In this case, it is useful to position the center 511 of $F_R$ circle 510 at the center of feature-relating tolerance consumed circle (consumed tolerance circle) 422 of FIG. 17. With $F_R$ circle 510 so positioned, the diameter of $F_R$ circle 510 can be set equal to $D_4$–$D_3$, where $D_3$ is the diameter of consumed tolerance circle 422 (of FIG. 17), and $D_4$ is the difference between the ideal hole size and the ideal pin size. Thus, $F_R$ circle 510 is centered at the center of consumed tolerance circle 422, which is displaced from "one true center" 400 which is the superimposition of the ideal positions of all features of the pattern.

As another example, consider the case that point 512 of FIG. 20 is the one true position 60 of above-described FIG. 7, and that $F_R$ circle 510 of FIG. 20 is indicative of the pattern described above with reference to above-described FIGS. 2–7. In this case, it is useful to position the center 511 of $F_R$ circle 510 at the center 64 of maximum inscribed circle 62 of FIG. 7. With $F_R$ circle 510 so positioned, the diameter of $F_R$ circle 510 can be set equal to $D_1$-VC, where $D_1$ is the diameter of inscribed circle 62 and VC is the virtual condition (for the pattern) described above with reference to FIG. 7.

It should be appreciated that some implementations of the invention employ float remaining figures which are not circles, but which can be used as are the float remaining circles described herein. For example, some such embodiments employ float remaining figures that are polygons. To generate a polygonal float remaining figure that corresponds to an already-determined float remaining circle (e.g., $F_R$ circle 510), one can employ surface data to perform a simple geometric transformation in a manner that will be apparent to those of ordinary skill in the art, thereby determining the polygonal float remaining figure.

An $F_R$ circle (or other float remaining figure) is indicative of the minimum float (for a pattern of features) that remains in all directions. Typically, the features have shapes that do not depart significantly from being rotationally symmetric (e.g., they are generally cylindrical holes or pins). However, significant errors in feature shape (which are significant departures from rotationally symmetric feature shape) would invalidate the simplification inherent in use of $F_R$ circles in accordance with an aspect of the invention. In the description herein of some embodiments of the invention, it is required that a best-fit rotation of each part (to maximize remaining float) be applied based on previously calculated and recorded values.

When an $F_R$ figure has been determined (in accordance with one aspect of the invention) for a pattern comprising identically-sized features (e.g., pins), average variation in feature size can be accommodated by slightly enlarging (for smaller pins) or shrinking (for bigger pins) the $F_R$ figure.

Figure 21:
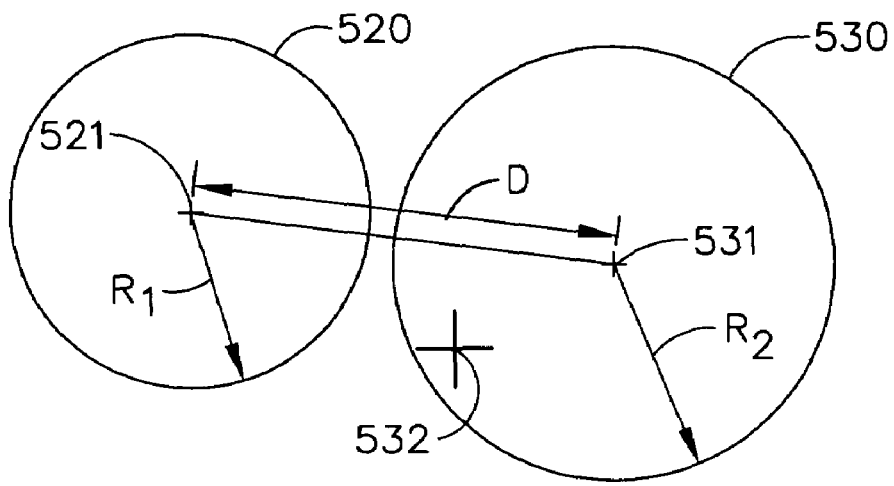
FIG. 21 is a diagram of two float remaining circles generated in accordance with an aspect of the invention.

In a class of embodiments, two or more $F_R$ figures (e.g., $F_R$ circles) are determined (each for a different manufactured pattern) and these figures are used in accordance with an aspect of the invention. As an example of such an embodiment, consider two parts to which fasteners in a pattern are to be inserted, after the parts have been located relative to each other. An $F_R$ figure (e.g., $F_R$ circle 520 of FIG. 21) is generated for one part, and an $F_R$ figure (e.g., $F_R$ circle 530 of FIG. 21) is generated for the other part. If $F_R$ circle 520 represents float remaining in a pattern of holes in the first part, $F_R$ circle 530 represents float remaining in a pattern of holes in the other part, and circles 520 and 530 are positioned (relative to point 532) so as not to overlap each other as shown in FIG. 21 it will not be possible to insert fasteners (e.g., pins) for assembly in this condition. The variation in pattern position and hole size prevent the parts from being so fastened together, as indicated by the lack of any overlap between $F_R$ circles 520 and 530.

When using two or more different $F_R$ figures (each for a different manufactured pattern), a construct must be defined which relates the position of each $F_R$ figure relative to the position of each other $F_R$ figure. Typically, a common origin is defined, and the position of each $F_R$ figure is determined relative to the common origin.

For example, consider the case that $F_R$ circle 520 of FIG. 21 is indicative of a first pattern of features having slightly different sizes and positions than does the pattern described above with reference to FIGS. 16 and 18, $F_R$ circle 530 of FIG. 21 is indicative of a second pattern of features having slightly different sizes and positions than those of the first pattern, and point 532 of FIG. 21 is the superimposition of true positions of all the features of both patterns. In this example, the center 521 of $F_R$ circle 520 is the center of a consumed tolerance circle generated for the first pattern in the same manner as is consumed tolerance circle 422 of FIG.

17, and the center 531 of $F_R$ circle 530 is the center of a consumed tolerance circle generated for the second pattern in the same manner as is consumed tolerance circle 422 of FIG. 17. Thus, $F_R$ circles 520 and 530 (each for a different pattern) are positioned relative to one "true center" (532) which is the superimposition of the ideal positions of all the features of both patterns.

For another example, consider the case that $F_R$ circle 520 of FIG. 21 is indicative of a first pattern having features of slightly different sizes and positions than does the pattern described above with reference to FIGS. 2–7, $F_R$ circle 530 of FIG. 21 is indicative of a second pattern of features having slightly different sizes and positions than those of the first pattern, and point 532 of FIG. 21 is a "one true position" for the first pattern (determined for the first pattern in a manner corresponding to the manner in which one true position 60 of FIG. 7 is generated for the pattern of FIGS. 2–7). In this example, the center 521 of $F_R$ circle 520 is the center of a maximum inscribed circle (similar to circle 62 of above-described FIG. 7) for the first pattern, where such maximum inscribed circle has been generated with reference to the "one true position" for the first pattern.

In the example of the immediately preceding paragraph, the center 531 of $F_R$ circle 530 for the second pattern can be determined as follows. Using data indicative of the transformation applied to a feature related tolerance zone framework (FRTZF) for the first pattern (corresponding to FRTZF 26 of FIG. 5 for the pattern of FIGS. 2–7) to generate a best fit framework for the first pattern (corresponding to the transformation applied to FRTZF 26 of FIG. 5 to generate best fit framework 50 of FIG. 6 for the pattern of FIGS. 2–7) and data indicative of the transformation applied to an FRTZF for the second pattern to generate a best fit framework for the second pattern (also corresponding to the transformation applied to FRTZF 26 of FIG. 5 to generate best fit framework 50 of FIG. 6), a transformed best fit framework can be determined for the second pattern. The transformed best fit framework determines how best to transform (both translation and rotation) the raw data for the second pattern (including the maximum inscribed circle for the second pattern) to superimpose the transformed raw data for the second pattern on the raw data for the first pattern (with a transformed one true position for second pattern superimposed on the one true position for the first pattern), and thus determines a best transformed position of the maximum inscribed circle for the second pattern relative to the one true position for the first pattern, and thus a best transformed position (point 531 of FIG. 21) for the center of the maximum inscribed circle for the second pattern relative to point 532 of FIG. 21 (which is the "one true position" for the first pattern).

It should be appreciated that any of many other techniques can be employed to relate the position of $F_R$ circle 520 relative to the position of $F_R$ circle 530 in the example of the two immediately preceding paragraphs. More generally, any of a variety of constructs can be defined to relate the position of each $F_R$ figure relative to the position of each other $F_R$ figure in some implementations of the invention which employ two or more $F_R$ figures. For example, one can use the magnitude and direction of the vector between a one true position for a first pattern and a maximum inscribed circle center for the first pattern, the magnitude and direction of the vector between a one true position for a second pattern and a maximum inscribed circle center for the second pattern, and data indicating how best fit frameworks for the first and second patterns are generated (each by translating and/or rotating a FRTZF common to both patterns) to locate the $F_R$ figures relative to each other. Or, one can generate a modified best fit framework for all patterns using data regarding the individual patterns, and use this modified best fit framework to locate the $F_R$ figures relative to each other.

Figure 22:
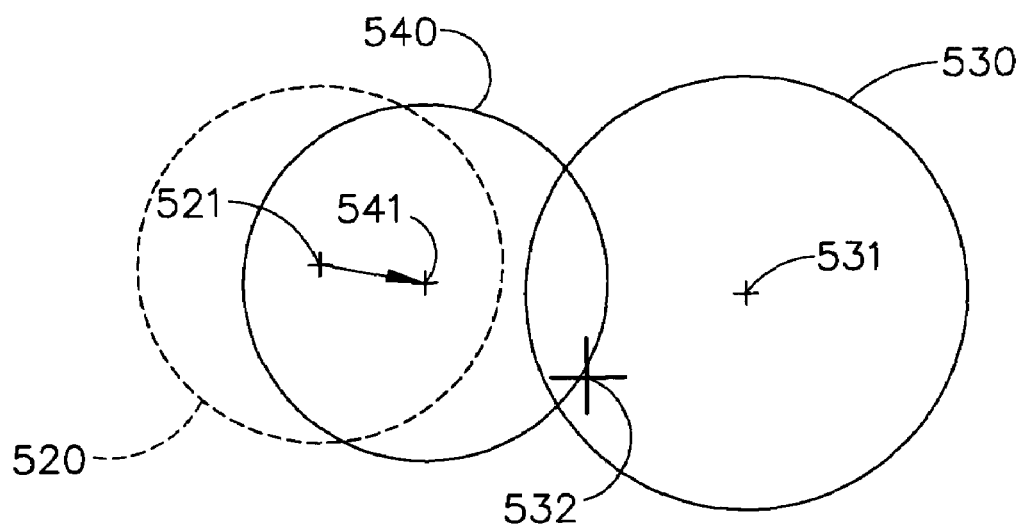
FIG. 22 is a diagram of three float remaining circles generated in accordance with an aspect of the invention.

If it is possible to adjust one or both manufactured patterns represented by non-overlapping $F_R$ figures (e.g., $F_R$ circles 520 and 530 of FIG. 21 or FIG. 22), it is typically desired to adjust one or both of the patterns (sometimes referred to herein as "parts") to cause relative movement of at least one of the $F_R$ figures along the vector between the centers of the two $F_R$ figures until the translated $F_R$ figures overlap (e.g., so that the patterns can be fastened together or otherwise used together). For example, if feature positions of a first pattern (represented by $F_R$ circle 520 of FIG. 21 or FIG. 22) are adjusted to cause the $F_R$ circle of the adjusted first pattern ($F_R$ circle 540 of FIG. 22) to overlap $F_R$ circle 530 of FIG. 21 or FIG. 22 (representing a second pattern), as shown in FIG. 22, the adjusted first pattern and the second pattern can be used together (e.g., pins can be inserted through aligned holes thereof).

Alternatively, if the size of features of the first pattern (represented by $F_R$ circle 520 of FIG. 21) can be enlarged to increase the diameter of the $F_R$ circle of the adjusted first pattern, and/or the size of features of the second pattern (represented by $F_R$ circle 530 of FIG. 21) can be enlarged to increase the diameter of the $F_R$ circle of the adjusted second pattern until the adjusted $F_R$ circles overlap, the adjusted first pattern and second pattern can be used together (e.g., pins can be inserted through aligned holes thereof).

The distance between the centers of two $F_R$ figures (e.g., distance D in FIG. 21) subtracted from the sum of their sizes (e.g., the sum of radius R1 of $F_R$ circle 520 and radius R2 of $F_R$ circle 530 of FIG. 21) provides a variable measure of 'rattle' in the assembly comprising the two patterns represented by the figures. Feature sizes or fabrication tolerances on later assemblies can be tuned to minimize this quantity (e.g., to minimize [D−(R1+R2)] in FIG. 21) while keeping the quantity greater than zero.

Figure 23:
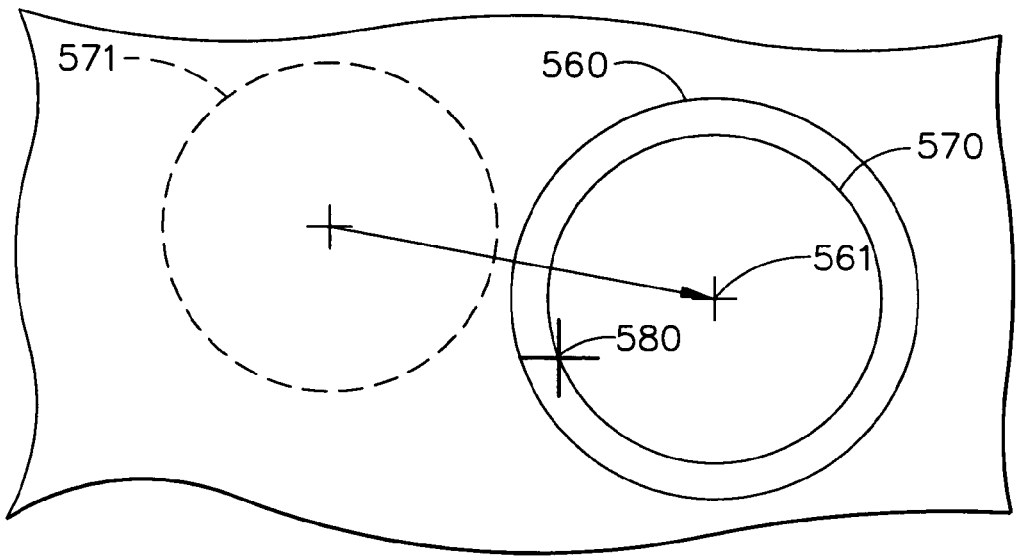
FIG. 23 is a diagram of three float remaining circles generated in accordance with an aspect of the invention.

For situations in which an assembly move is determined by the features in a pattern, the in-plane component of the translation move is defined by the vector between the two $F_R$ figures. For example, if features of a first pattern (represented by $F_R$ circle 570 of FIG. 23) can be adjusted to cause the center of the $F_R$ circle of the adjusted first pattern to move along the vector between the $F_R$ figure for the first pattern and a larger diameter $F_R$ figure for a second pattern (e.g., $F_R$ circle 560 of FIG. 23) to a point within the $F_R$ figure for the second pattern, such a transform would maximize the remaining float between the object and the target. An example of this is a transform in which features of a first pattern (represented by $F_R$ circle 570) are adjusted to cause the center of $F_R$ circle 570 to move from a first point (571) to the center (561) of a larger diameter $F_R$ circle (circle 560 of FIG. 23).

If there is some other feature on any part (of a set of patterns) that constrains relative movement of $F_R$ figures for the parts, those limits can be compared to the move vector. One example of such a constraint is curvature on the surfaces of a part where gapping or interference would prohibit the desired move. An adjusted move can be attempted to see if the part can be adjusted to prevent a tolerance violation.

Figure 24:
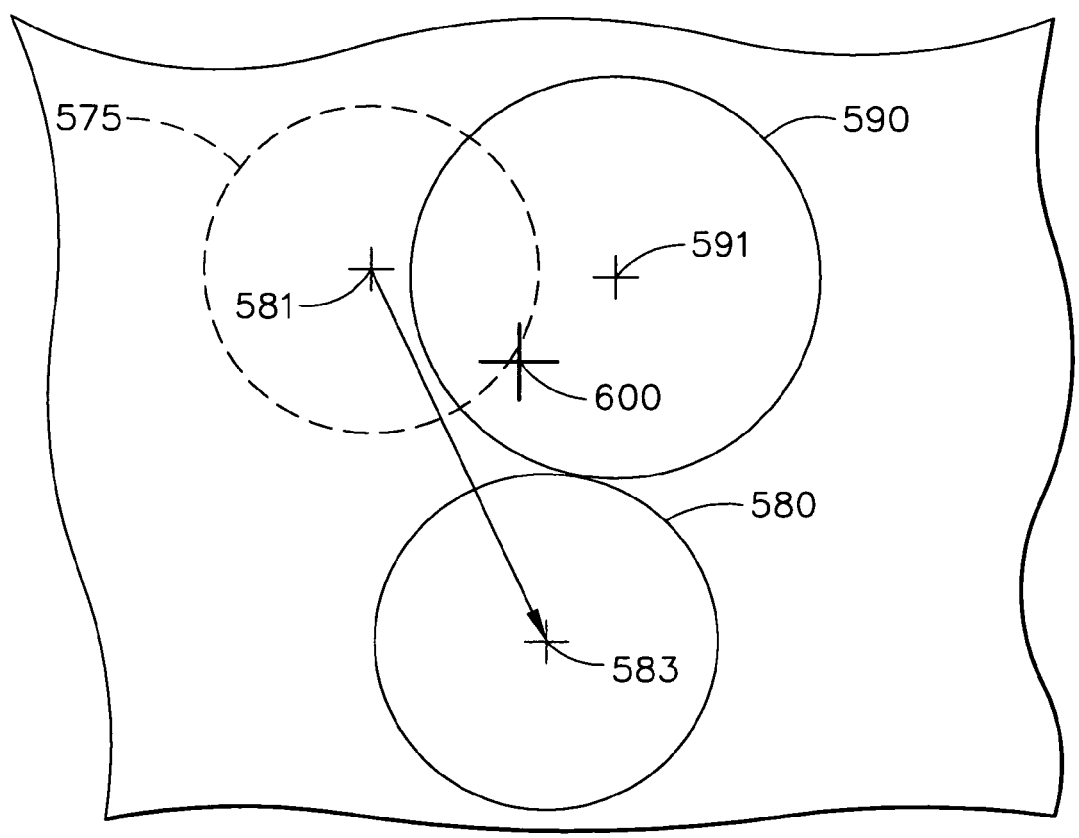
FIG. 24 is a diagram of three float remaining circles generated in accordance with an aspect of the invention.

For a bias move (e.g., one determined by gravity, kinematic considerations, or otherwise), features of one pattern can be adjusted to cause the object (the $F_R$ figure corresponding to such pattern) to move along the desired vector until the two $F_R$ figures (one figure corresponding to the adjusted version of one of the patterns; the other figure to the other pattern) are on the verge of no longer touching. An example of such a bias move will be described with reference to FIG. 24, in which all $F_R$ circles are located relative to one true position 600. As shown in FIG. 24, features of a first pattern (represented by $F_R$ circle 575 of FIG. 24 having center 581) are adjusted to move the $F_R$ circle of the adjusted first pattern ($F_R$ circle 580 of FIG. 24, having center 583) just enough so that the latter circle does not overlap the $F_R$ circle of a second pattern ($F_R$ circle 590 of FIG. 24, having center 591).

Figure 25:
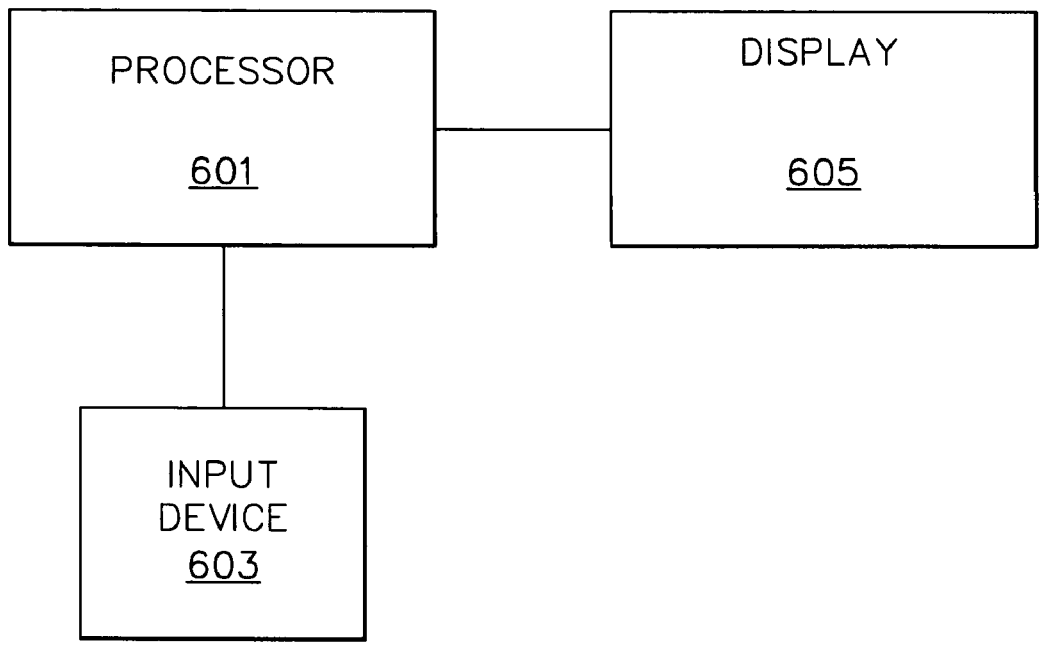
FIG. 25 is a block diagram of a computer system for implementing any embodiment of the inventive method.
Figure 26:
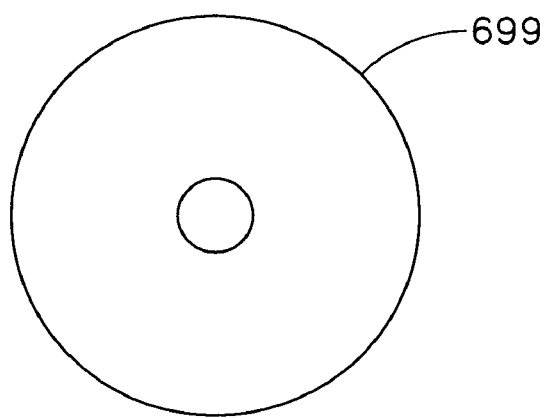
FIG. 26 is an elevational view of a computer readable optical disk on which is stored computer code for implementing any embodiment of the inventive method.

The computer system of FIG. 25 includes processor 601, input device 603 coupled to processor 601, and display device 605 coupled to processor 601. Processor 601 is programmed to implement the inventive method in response to instructions and data entered by user manipulation of input device 603. Computer readable optical disk 699 of FIG. 26 has computer code stored thereon. This code is suitable for programming processor 601 to implement an embodiment of the inventive method.

Figure 27:
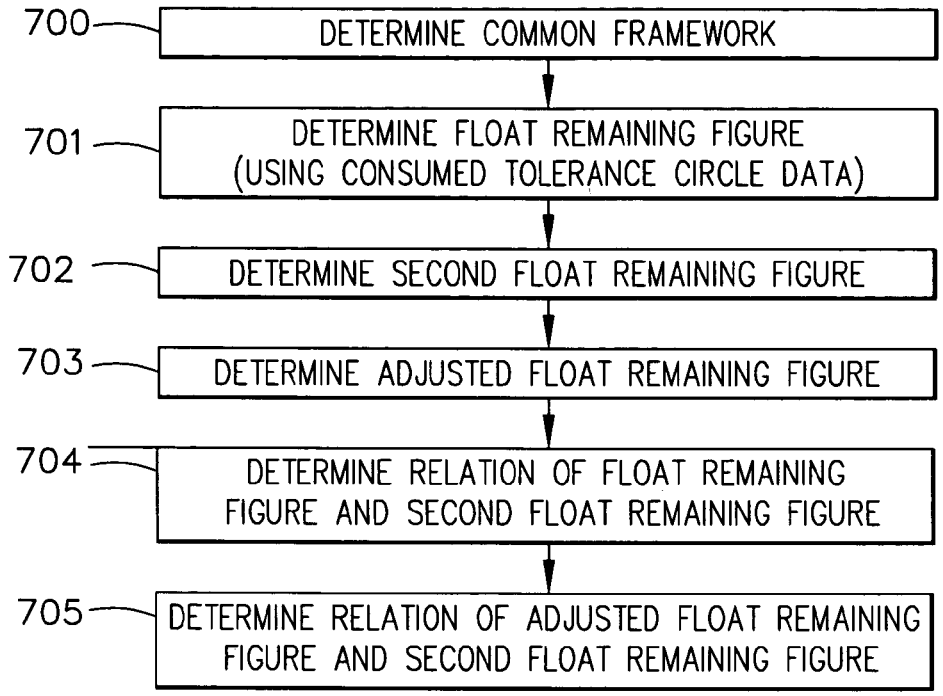
FIG. 27 is a flowchart of steps performed in some embodiments of the inventive method.

FIG. 27 is a flowchart of steps performed in some embodiments of the inventive method for assessing fit of a pattern of features with a second pattern of features. A common framework for the features of the pattern and the features of the second pattern is determined (step 700). This can be done, for example, in the manner described above with reference to FIG. 17 in which the common framework for departure circles 412, 414, and 416 is determined. The translation and rotation of the common framework is determined relative to the as designed framework of each pattern. A float remaining figure (e.g., circle 520 of FIG. 22), having size indicative of float remaining in the pattern, is also determined (step 701) by processing data indicative of the pattern. The float remaining figure has a first position (e.g., the position of circle 520 of FIG. 22) determined relative to the common framework. A second float remaining figure (e.g., circle 530 of FIG. 22), having size indicative of float remaining in the second pattern is determined (step 702) by processing data indicative of the second pattern. Step 702 determines a position of the second float remaining figure (a "second position") relative to the common framework, such that the second position (e.g., the position of circle 530 of FIG. 22) is displaced relative to the position of the float remaining figure by a displacement vector (e.g., the vector between the centers of circles 520 and 530 in FIG. 22). The rotation values for the common frameworks is used to rotate the patterns.

To perform step 700, data indicative of the pattern are processed to generate data indicative of a feature-relating tolerance consumed circle (for example, in the manner described above with reference to FIG. 17 in which consumed tolerance circle 422 is determined). During step 701, data indicative of the feature-relating tolerance consumed circle are processed to determine the first position (e.g., the position of circle 520 of FIG. 22) relative to the center of the feature-relating tolerance consumed circle. During step 702, data indicative of the common framework are processed to determine the position of the second float remaining figure (e.g., the position of circle 530 of FIG. 22) relative to the common framework.

Also, an adjusted float remaining figure (e.g., circle 540 of FIG. 22) is determined (step 703) by processing data indicative of an adjusted version of the pattern. The adjusted float remaining figure has a position (an "adjusted position," e.g., the position of circle 540 of FIG. 22) which is determined relative to the common framework and is located along the displacement vector (e.g., along the vector between the centers of circles 520 and 530 in FIG. 22).

The float remaining figure determined in step 701 can be a float remaining circle having a center at the first position (e.g., circle 520 of FIG. 22) and a diameter indicative of the remaining clearance of the pattern, the second float remaining figure determined in step 702 can be a float remaining circle having a center at the second position (e.g., circle 530 of FIG. 22) and a diameter (indicative of the remaining clearance of the second pattern), and the adjusted float remaining figure determined in step 703 (e.g., circle 540 of FIG. 22) can be a float remaining circle having a center at the adjusted position and the same diameter as the second pattern.

The method also includes the operation (step 704) of determining at least one of relative location of the float remaining figure and the second float remaining figure (e.g., relative location of circles 520 and 530 of FIG. 22), and overlap of the float remaining figure and the second float remaining figure, and the operation (step 705) of determining at least one of relative location of the adjusted float remaining figure and the second float remaining figure (e.g., relative location of circles 530 and 540 of FIG. 22), and overlap of the adjusted float remaining figure and the second float remaining figure (e.g., overlap of circles 530 and 540 of FIG. 22).

Figure 28:
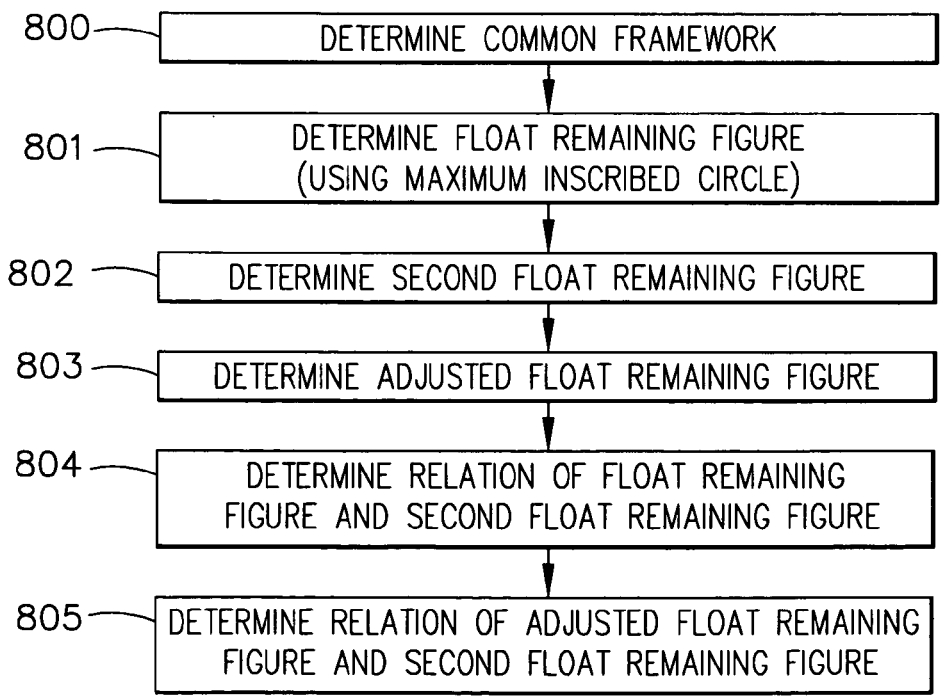
FIG. 28 is a flowchart of steps performed in some other embodiments of the inventive method.

FIG. 28 is a flowchart of steps performed in some embodiments of the inventive method for assessing fit of a pattern of features with a second pattern of features. A common framework for the features of the pattern and the features of the second pattern is determined (step 800). This can be done, for example, in the manner described above with reference to FIGS. 5–7 in which the common framework for features 30, 32, 34, and 36 of FIG. 7 is determined. A float remaining figure (e.g., circle 520 of FIG. 22), having size indicative of float remaining in the pattern, is also determined (step 801) by processing data indicative of the pattern. The float remaining figure has a first position (e.g., the position of circle 520 of FIG. 22) determined relative to the common framework. A second float remaining figure (e.g., circle 530 of FIG. 22), having size indicative of float remaining in the second pattern is determined (step 802) by processing data indicative of the second pattern. Step 802 determines a position (e.g., the position of circle 530 of FIG. 22) of the second float remaining figure (a "second position") relative to the common framework, such that the second position is displaced relative to the position of the float remaining figure by a displacement vector (e.g., the vector between the centers of circles 520 and 530 of FIG. 22).

To perform step 800, data indicative of the pattern are processed to generate data indicative of a maximum inscribed circle for the pattern (for example, in the manner described above with reference to FIG. 7 in which maximum inscribed circle 62 is determined). During step 801, data indicative of the maximum inscribed circle are processed to determine the first position relative to the center of the maximum inscribed circle. During step 802, data indicative of the common framework are processed to determine the position of the second float remaining figure (e.g., the position of circle 530 of FIG. 22) relative to the common framework.

Also, an adjusted float remaining figure (e.g., circle 540 of FIG. 22) is determined (step 803) by processing data indicative of an adjusted version of the pattern. The adjusted float remaining figure has a position (an "adjusted position," e.g., position 541 of circle 540 of FIG. 22) which is determined relative to the common framework and is located along the displacement vector (e.g., along the vector between the centers of circles 520 and 530 of FIG. 22).

The float remaining figure determined in step 801 can be a float remaining circle having a center at the first position (e.g., circle 520 of FIG. 22) and a diameter indicative of the remaining clearance of the pattern, the second float remaining figure determined in step 802 can be a float remaining circle (e.g., circle 530 of FIG. 22) having a center at the second position and a diameter (indicative of the remaining clearance of the second pattern), and the adjusted float remaining figure determined in step 803 can be a float remaining circle (e.g., circle 540 of FIG. 22) having a center at the adjusted position and the same diameter as the original pattern.

The method also includes the operation (step 804) of determining at least one of relative location of the float remaining figure and the second float remaining figure (e.g., relative location of circles 520 and 530 of FIG. 22), and overlap of the float remaining figure and the second float remaining figure, and the operation (step 805) of determining at least one of relative location of the adjusted float remaining figure and the second float remaining figure (e.g., relative location of circles 530 and 540 of FIG. 22), and overlap of the adjusted float remaining figure and the second float remaining figure (e.g., overlap of circles 530 and 540 of FIG. 22).

It should be understood, of course, that the foregoing relates to exemplary embodiments of the invention and that modifications may be made without departing from the spirit and scope of the invention as set forth in the following claims.

We claim:

1. A method for assessing fit of a pattern of features with a second pattern of features, including the steps of:

processing data indicative of the pattern to generate data indicative of a feature-relating tolerance consumed circle having a center;

generating a float remaining circle having a diameter and a center position by processing data indicative of the pattern, wherein the diameter is indicative of float remaining in the pattern, and the center position of the float remaining circle is determined by the center of the feature-relating tolerance consumed circle;

generating a second float remaining circle, having a diameter indicative of float remaining in the second pattern, by processing data indicative of the second pattern, determining a common framework for the features of the pattern and the features of the second pattern, such that the common framework determines relative location of the float remaining circle and the second float remaining circle;

generating an adjusted float remaining circle by processing data indicative of an adjusted version of the pattern; and using the float remaining circle and the second float remaining circle to assess fit of the pattern with the second pattern, and using the adjusted float remaining circle and the second float remaining circle to assess fit of the adjusted version of the pattern with the second pattern.

2. The method of claim 1, wherein the pattern is a simulated manufactured pattern, said method also including the steps of:

generating simulation data indicative of the pattern; and generating the float remaining figure by processing the simulated data.

3. The method of claim 1, wherein the center position of the float remaining circle is determined relative to the common framework, the adjusted float remaining circle has an adjusted position, and the adjusted position is also determined relative to the common framework.

4. The method of claim 3, wherein the second float remaining circle has a center position relative to the common framework, the center position is displaced relative to the center position of the float remaining circle by a displacement vector, and the adjusted position is located along the displacement vector.

5. The method of claim 4, wherein the diameter of the float remaining circle is indicative of a remaining clearance of the pattern.

6. The method of claim 5, wherein the center position of the float remaining circle is determined by the center of the feature-relating tolerance consumed circle.

7. The method of claim 5, also including the step of:

processing data indicative of the pattern to generate data indicative of a maximum inscribed circle for the pattern, wherein the maximum inscribed circle has a center, and wherein the center position of the float remaining circle is determined by the center of the maximum inscribed circle.

* * * * *